United States Patent
Fuchsmann et al.

(10) Patent No.: US 12,306,078 B2
(45) Date of Patent: May 20, 2025

(54) DYNAMIC HEADSPACE VACUUM TRANSFER "IN TRAP" EXTRACTION METHOD AND APPARATUS

(71) Applicant: CTC Analytics AG, Zwingen (CH)

(72) Inventors: Pascal Fuchsmann, Torny-le-Grand (CH); Fabian Wahl, Buchs (CH); Patrick Bischoff, Münsingen (CH); Mireille Tena Stern, Fribourg (CH)

(73) Assignee: CTC Analytics AG, Zwingen (CH)

( * ) Notice: Subject to any disclaimer, the term of this patent is extended or adjusted under 35 U.S.C. 154(b) by 596 days.

(21) Appl. No.: 17/428,820

(22) PCT Filed: Feb. 7, 2019

(86) PCT No.: PCT/CH2019/000002
§ 371 (c)(1),
(2) Date: Aug. 5, 2021

(87) PCT Pub. No.: WO2020/160686
PCT Pub. Date: Aug. 13, 2020

(65) Prior Publication Data
US 2022/0018740 A1    Jan. 20, 2022

(51) Int. Cl.
G01N 30/06    (2006.01)
G01N 1/22     (2006.01)
G01N 1/40     (2006.01)
G01N 30/88    (2006.01)

(52) U.S. Cl.
CPC .......... *G01N 1/2226* (2013.01); *G01N 1/405* (2013.01); *G01N 30/06* (2013.01); *G01N 2001/2229* (2013.01); *G01N 2030/884* (2013.01)

(58) Field of Classification Search
CPC ...... G01N 1/2226; G01N 1/405; G01N 30/06; G01N 2001/2229; G01N 2030/884
USPC ........................................................ 73/23.35
See application file for complete search history.

(56) References Cited

U.S. PATENT DOCUMENTS

| | | | | |
|---|---|---|---|---|
| 4,096,734 A * | 6/1978 | Khayat | .................. | G01N 33/02 73/863.81 |
| 4,600,559 A * | 7/1986 | Hiatt | ...................... | G01N 25/14 422/240 |
| 5,152,176 A * | 10/1992 | Bryselbout | .......... | G01N 30/461 422/89 |
| 10,197,541 B2 * | 2/2019 | Ghiasvand | ............. | G01N 30/12 |
| 10,794,806 B2 * | 10/2020 | Porter | ...................... | G01N 1/44 |
| 2016/0193785 A1 * | 7/2016 | Bell | ....................... | B29C 64/118 264/255 |

(Continued)

OTHER PUBLICATIONS

J. Pawliszyn, "Solid Phase Microextraction Theory and Practice", Wiley-VCR, New York/Weinheim 1997, pp. 11-42.

(Continued)

*Primary Examiner* — Peter J Macchiarolo
*Assistant Examiner* — Rodney T Frank
(74) *Attorney, Agent, or Firm* — J-TEK LAW PLLC; Jeffrey D. Tekanic; Scott T. Wakeman

(57) ABSTRACT

A headspace extraction and analysis method for volatile compounds can be performed in automatic mode in a HS-ITEX apparatus adapted to be additionally connectable to a vacuum source. The method includes extracting the headspace by sucking volatile compounds into a sorbent-containing trap followed by desorption into the injector of a GC-MS analyzer.

16 Claims, 15 Drawing Sheets

Sample conditioning    Extraction    Drying    Desorption    Trap Cleaning

(56) References Cited

U.S. PATENT DOCUMENTS

| | | | |
|---|---|---|---|
| 2017/0023533 A1* | 1/2017 | Ghiasvand | G01N 30/12 |
| 2017/0184554 A1 | 6/2017 | Ghiasvand et al. | |
| 2018/0172647 A1* | 6/2018 | Hall | G01N 30/08 |
| 2019/0346351 A1* | 11/2019 | Porter | G01N 1/10 |

OTHER PUBLICATIONS

J. Pawliszyn, "Solid Phase Microextraction Theory and Practice", Wiley-VCR, New York/Weinheim 1997, pp. 141-170.

J. Pawliszyn, "Solid Phase Microextraction Theory and Practice", Wiley-VCR, New York/Weinheim 1997, pp. 170-191.

A. C. Farcas, et al., "Volatile profile, fatty acids composition and total phenolics content of brewers' spent grain byproduct with potential use in the development of new functional foods", J Cereal Sci, 64 (2015) 34-42.

A. Kremser, et al., "Systematic comparison of static and dynamic headspace sampling techniques for gas chromatography", Anal Bioanal Chem, 408 (2016) 6567-6579.

B. Kolb, et al. "A gas chromatographic assay for quantitative analysis of volatiles in solid materials by discontinuous gas extraction", Chromatographia, vol. 10, No. 12 (1977) 705-711.

C. Arthur, et al., "Solid phase microextraction with thermal desorption using fused silica optical fibers", Anal. Chem. 62, 1990, p. 2145-2148.

D. Canac-Arteaga, et al., "Analytical artifacts caused by the presence of water vapor int the headspace of food products", Analusis, 28 (2000) 550-556.

D. Michiu, et al. "Optimization of ITEX/GCMS method for beer wort volatile compounds characterisation", J Agroaliment Proc Technol, 18(3) (2012) 229-235.

E. K. Yianthi, et al., "Vacuum-assisted headspace solid phase microextraction of polycyclic aromatic hydrocarbons in solid samples", Anal Chim Acta, 890 (2015) 108-116.

E. Psillakis, et al., "Effect of Henry's law constant and operating parameters on vacuum-assisted headspace solid phase microextraction", J Chromatogr A, 1244 (2012) 55-60.

E. Psillakis, et al., "Vacuum-assisted headspace solid phase microextraction: Improved extraction of semivolatiles by non-equilibrium headspace sampling under reduced pressure conditions", Anal Chim Acta, 742 (2012) 30-36.

E. Yiantzi, et al., "Design and testing of a new sampler for simplified vacuum-assisted headspace solid-phase microextraction", Anal Chim Acta, 927 (2016) 46-54.

E.A. Tavss, et al., "Analysis of flavor absorption into plastic packaging materials using multiple headspace extraction gas chromatography", Journal of Chromatography, 438 (1988) 281-289.

I. Rasanen, et al., "Headspace in-tube extraction gas chromatography-mass spectrometry for the analysis of hydroxylic methyl-derivatized and volatile organic compounds in blood and urine", J Anal Toxicol, 34 (2010) 113-121.

J. Laaks, et al., "In-tube extraction of volatile organic compounds from aqueous samples: An economical alternative to burge and trap enrichment", Anal Chem, 82 (2010) 7641-7648.

J. Laaks, et al., "Optimization strategies of in-tube extraction (ITEX) methods", Anal Bioanal Chem, 407 (2015) 6827-6838.

J. Laaks, et al., "In-Tube Extraction-GC-MS as a High-Capacity Enrichment Technique for the Analysis of Alcoholic Beverages", J Agri Food Chem, 62 (2014) 3081-3091.

T. Senthilkumar, et al., "Characterization of volatile organic compounds released by granivorous insects in stored wheat", J Stored Prod Res, 48 (2012) 91-96.

J. Zapata, et al., "Automated and quantitative headspace in-tube extraction for the accurate determination of highly volatile compounds from wines and beers", J Chromatogr A, 1230 (2012) 1-7.

J. Zapata, et al., "Multiple automated headspace in-tube extraction for the accurate analysis of relevant wine aroma compounds andfor the estimation of their relative liquid-gas transfer rates", J Chromatogr A, 1266 (2012) 1-9.

L. Niu, et al., "Odor Properties and volatile Compounds Analysis of Torreya grandis Aril Extracts", J Essent Oil Res, 23 (2011) 1-6.

L.-C. Salanta, et al., "Determination of the Volatile Compounds from Hop and Hop Products using ITEX/GC-MS Technique", J. Agroaliment Proc Technol, 18(2) (2012) 110-115.

M. A. Jochmann, et al. "In-tube extraction for enrichment of volatile organic hydrocarbons from aqueous samples", J ChromatogrA, 1179 (2008) 96-105.

M. H. Hiatt, "Analyses of fish tissue by vacuum distillation/gas chromatography/mass spectrometry", Anal Chem, 69 (1997) 1127-1134.

M. H. Hiatt, "Vacuum Distillation Coupled with Gas Chromatography/Mass Spectrometry for the Analysis of Environmental Samples", Anal Chem, 67 (1995) 4044-4052.

M. Kusano, et al., "Unbiased profiling of volatile organic compounds in the headspace of Allium plants using an in-tube extraction device", BMC Res Notes, 9 (2016) 133 (1-12).

M. T. Suzuki, et al. "Gas chromatographic estimation of occluded solvents in adhesive tape by periodic introduction method", Anal Chem, 42 (1970) 1705-1708.

N. P. Brunton, et al., "The effects of temperature and pressure on the performance of Carboxen/PDMS fibres during solid phase microextraction (SPME) of headspace volatiles from cooked and raw turkey breast", Flavour Fragr J, 16 (2001) 294-302.

P. Fuchsmann, et al., "Olfactometry Profiles and Quantitation of Volatile Sulfur Compounds of Swiss Tilsit Cheeses", J Agric Food Chem, 63 (2015) 7511-7521.

P. J. Nyman, et al., "Single-Laboratory Validation of a Method for the Determination of Select Volatile Organic Compounds in Foods by Using Vacuum Distillation with Gas Chromatography/Mass Spectrometry", J. AOAC Intl., 97 (2) (2014) 510-520.

S. A. Socaci, et al., "Chemometric discrimination of different tomato cultivars based on their volatile fingerprint in relation to lycopene and total phenolics content", Phytochem Anal, 25 (2014) 161-169.

S. A. Socaci, et al., "Optimization of ITEX/GC-MS Method for Determination of Indigenous Rosemary Volatiles", Bulletin UASVM Agriculture, 68(2) (2011) 423-429.

S. B. Ampuero, et al., "Classification of unifloral honeys with an MS-based electronic nose using different sampling modes: SHS, SPME and INDEX", Eur Food Res Technol, 218 (2004) 198-207.

S. Kakuta, et al., "Metabolic profiling of oxidized lipid-derived volatiles in blood by gas chromatography/mass spectrometry with in-tube extraction", Mass Spectrometry (Tokyo), 2 (2013) A0018 (1-8).

S.A. Socaci, et al., "In-tube Extraction and GC-MS Analysis of Volatile Components from Wild and Cultivated sea buckthorn (*Hippophae rhamnoides* L. ssp. Capatica) Berry Varieties and Juice", Phytochem Anal, 24 (2012) 319-328.

T. E. Zimmermann, et al., "Depletion solid-phase microextraction for the evaluation of fiber-sample partition coefficients of pesticides", J Chromatogr A, 1102 (2006) 51-59.

T. Gorecki, et al., "Effect of sample volume on quantitative analysis by solid-phase microextraction, Part 1. Theoretical considerations", Analyst, 122 (1997) 1079-1086.

T. Hueffer, et al., "Multi-walled carbon nanotubes as sorptive material for solventless in-tube microextraction (ITEX2)-as factorial design study", Anal Bioanal Chem, 405 (2013) 8387-8395.

T. K. Gorecki, et al., "The effect of sample volume on quantitative analysis by solid phase microextraction, Part 2. Experimental verification", Analyst 123 (1998) 2819-2824.

Eom, In-Yong, et al., "Development of a syringe pump assisted dynamic headspace sampling technique for needle trap device", Journal of Chromatography A, Elsevier, Amsterdam, NL, vol. 1196-1197, Jul. 4, 2008, pp. 10-14, XP022732317, ISSN: 0021-9673.

International Search Report and Written Opinion dispached Aug. 13, 2020 in parent application No. PCT/CH2019/000002.

Warren, Jamie M., et al., "Development and evaluation of needle trap device geometry and packing methods for automated and manual analysis", Journal of Chromatography A, Elsevier, Amsterdam, NL, vol. 1218, No. 50, Oct. 4, 2011, pp. 8982-8988, XP028119431, ISSN: 0021-9673.

(56) References Cited

OTHER PUBLICATIONS

Kedziora-Koch, Kamila et al., "Needle-based extraction techniques with protected sorbent as powerful sample preparation tools to gas chromatographic analysis: Trends in application", Journal of Chromatography A, Elsevier, Amsterdam, NL, vol. 1565, Jun. 19, 2018, pp. 1-18, XP085417707, ISSN: 0021-9673.

Lord, Heather L., et al., "Fundamentals and applications of needle trap devices—A critical review", Analytica Chimica Acta, Elsevier, Amsterdam, NL, vol. 677, No. 1, Sep. 10, 2010, pp. 3-18, XP027289515, ISSN: 0003-2670.

Zang, Xiaohaun, et al., "Determination of volatile organic compounds in pen inks by a dynamic headspace needle trap device combined with gas chromatography-mass spectrometry", Journal of Chromatography A, Elsevier, Amsterdam, NL, vol. 1513, Jul. 11, 2017, pp. 27-34, XP085148791, ISSN: 0021-9673.

\* cited by examiner

DYNAMIC HEADSPACE VACUUM TRANSFER "IN TRAP" EXTRACTION METHOD AND APPARATUS

CROSS-REFERENCE

This application is the U.S. National Stage of International Application No. PCT/CH2019/000002 filed on Feb. 2, 2019.

TECHNICAL FIELD

The present invention regards the sampling of volatile compounds in various matrices and the analysis of the obtained samples by means of gas chromatography-mass spectrometry (GC-MS).

BACKGROUND ART

In analytics of volatile compounds, a major challenge is to ensure that sample quality is maintained throughout the analytical workflow. This is one of the main reasons why headspace (HS) sampling techniques are privileged. Extended heat treatment and extraction time can result in artefact formation, change of the molecular structure, and even degradation of the sample.

Automated HS-microextraction sampling techniques perform extraction and injection into the gas chromatography (GC) in a single step, but are often resulting in a discriminative transfer of compounds from the sample into the headspace. Phase partition coefficients air-water ($K_{aw}$), sorbent-air ($K_{sorb-a}$), and sorbent-water ($K_{sorb-w}$) are the three factors which influence the phase distribution during the extraction for a system in equilibrium [1]. Headspace-solid-phase microextraction (HS-SPME) [37, 38] is currently the most suitable automated technique to extract volatile organic compounds (VOCs) from a complex matrix without specific sample preparation. However, HS-SPME is limited to about 150 extractions per fiber and tend to differ from one fiber batch to another; careful standardization is needed in order to obtain accurate results, especially for quantitative analyses. In order to overcome certain drawbacks of SPME and add dynamic and automated features at the same time, 'in-tube extraction' (ITEX) was introduced in 2006 by CTC Analytics AG (Zwingen, Switzerland). The technique is generally operated with a multifunctional autosampler. HS-ITEX is a solventless dynamic HS microextraction technique derived from several other similar techniques (such as SPME and stir bar sorptive extraction (SBSE)) which are listed and described by Jochmann et al [2]. HS-ITEX is based on the theory of multiple headspace extraction (MHE) [3] [4-6] and is an interesting alternative to HS-SPME; it has been used to extract numerous volatile chemical compounds from various matrices including food, plants, pollutants, and biological fluids [2, 7-18]. Another very similar technique developed by SmartNose SA (Marin-Epagnier, Switzerland), 'Inside Needle Dynamic Extraction' (INDEX), uses the same concept of extraction as HS-ITEX and further HS extraction techniques have been extensively reviewed in the literature [19]. The improvement of many parameters in HS-ITEX is needed to achieve adequate signals through optimized extraction thermal desorption [8, 20]. HS-ITEX key parameters are: the nature of the sorbent, the number of strokes (according to literature: between 20 and 120 [2, 3, 9, 14, 21]), the extraction speed, the desorption speed, the sample, the trap and syringe temperature, and the headspace volume extracted. A wide range of commercial extraction polymers is available on the market, and was evaluated by Laaks et al [22]. The trap can also be filled with other noncommercial sorbents such as multiwalled carbon nanotubes or polystyrene-divinybenzene [1, 12]. The choice of the sorbent material is made based on the target molecule to be extracted. Depending on the matrix and desired results, improvement of different parameters may be required, making the optimization of the technology very complex compared to HS-SPME [23].

Several publications have reported a significant improvement of the extraction under reduced-pressure using so-called vacuum HS-SPME [24-26]. However, this technique has similar disadvantages as already mentioned for the usual, ambient pressure HS-SPME and can up to now only be used manually.

Also already known is Vacuum distillation coupled with gas chromatography (VD-GC) [27-30]. This has the disadvantage that no enhancement of concentration is possible.

Thus, there is still a need for an improved sampling and analysis method.

DISCLOSURE OF THE INVENTION

Hence, it is a general object of the invention to provide a headspace extraction technique that is reproducible, robust and sensitive, and preferably usable in automatic mode, in particular an extraction technique that can be based on HS-ITEX hardware.

Now, in order to implement these and still further objects of the invention, which will become more readily apparent as the description proceeds, the headspace extraction and analysis method for volatile compounds is manifested by the features that it is operated under reduced pressure, in particular a headspace extraction and analysis method comprising (i) inserting a needle of a sampling means via a septum into the headspace above a solid or liquid sample contained in a container closed by said septum, wherein said sampling means has a trap filled with a sorbent, said trap has a first end and a second end and at its first end is connected to a needle and at its second end is connected with at least one flow channel for connecting the trap to a vacuum source and an inert gas source, (ii) applying a vacuum to said sampling means on the side of the second end of the trap, the distant side, so that volatile compounds in the headspace are sucked out from the container into the trap, (iii) removing the sampling means from the container, (iv) drying the sampling means by flowing a dry inert gas through it, preferably from the distant side, (v) inserting the needle into an injector of a gas chromatography apparatus, (vi) desorbing the volatile compounds from the trap, preferably by flowing the at least one sorbent with inert gas from the distant side, (vii) analyzing the volatile compounds and (viii) cleaning the trap and needle by flushing with inert gas.

The term sorbent, sorption as used herein encompasses adsorbents/adsorption and absorbents/absorption.

Another subject matter of the present invention is a headspace extraction device for performing the method, preferably a HS-ITEX apparatus adapted to the inventive method and most preferably an apparatus allowing an automatic mode performance of the method.

The device comprises a sampling means having a trap filled with a sorbent, which trap has a first end and a second end and at its first end is connected to a needle and at its second end is connected with a flow channel for connecting the trap to a vacuum source and an inert gas source. Such a headspace extraction device makes it possible to perform the method according to the invention. Such a sampling means can be a syringe as known from the HS-ITEX method, i.e. a sampling means comprising a needle connected to a trap, said trap being connected to a body via a connecting means, said body being formed by a syringe body and a syringe holder, wherein the flow channel extending from the second end of the trap is formed by the connecting means, the inner volume of the syringe body and a channel in the syringe holder.

In a preferred embodiment, the flow channel is closable, e.g. for a starting phase such as sample conditioning. A suitable closing means is a piston as e.g. present in the sampling means of the HS-ITEX method.

Preferably, the flow channel at its end facing away from the trap is connected to a valve, preferably to a 3-port/2-way valve, for selectively connecting it to a vacuum source or to an inert gas source.

The valve, in a preferred embodiment of the device, has a gas distribution block with three ports, one port for the flow channel, one port for the vacuum source and one port for the inert gas source.

The gas distribution block in a preferred embodiment is ashlar-shaped and the ports end in three openings in a first side of said gas distribution block, which openings are arranged in line with an equal spacing, preferably with a spacing of about 3 mm between the centers of the openings, in the center area of said first side.

The ports by advantage are arranged at one or several sides of the gas distribution block which are perpendicular to the first side.

In that case it is further preferred that the ports for the vacuum source and for the inert gas source are arranged at a second side of the gas distribution block and the port for the flow channel is arranged at a third side of the gas distribution block, wherein the third side is arranged opposite to the second side.

If the gas distribution block is produced by employing 3D-printing, which is preferred, the distribution channels within the block may have any desired shape. Thus, by doing so, embodiments become possible in which the distribution channels may have a minimum volume.

The inventors have termed their method "Dynamic Headspace Vacuum Transfer in Trap Extraction (DHS-VTT)". This term is further on used herein.

It has been found that a significant improvement of the HS-ITEX technique is obtained if the principle of strokes is replaced by continuous dynamic extraction conditions. It has been found, in particular, that the ITEX trap can extract more volatile compounds and in a shorter time if exposed to a continuous stream of inert gas, like nitrogen. Although a continuous stream of inert gas through a sample or at least a headspace over the sample cannot easily be applied, whereas a continuous flow of volatile compounds can be forced by applying reduced pressure conditions, the HS-ITEX technique has been adapted (modified) accordingly. Such reduced pressure extraction was found to not only provide the benefit of a more complete extraction but also the reduced pressure extraction method that can be performed in an automatic mode.

Depending on the sample to be analyzed, methods according to the present teachings can be optimized with regard to the reduced pressure, the inert gas flow and/or the trap temperature. For example, the temperature of the trap in steps (i) to (iii), i.e. the adsorption steps, may be lower than its temperature in steps (vi) and (viii), the desorption steps.

The reduced pressure, the temperature and the volume of the sample and the temperature of the trap are crucial. In preferred embodiments, a suitable temperature of the trap during steps (i) to (iii) is in the range of 0 to 100° C., preferably 10 to 40° C. and/or a suitable temperature of the sample is in the range of 0 to 100° C., preferably about 45° C. and/or a suitable pressure in step (ii) is below 100 mbar, preferably below 50 mbar, most preferred about 10 mbar. The higher the temperature in the sample and the lower the pressure, the more volatile compounds are released into the headspace, but the higher the temperature in the trap and the lower the pressure therein, the less efficient is the adsorption of the volatile compounds. In addition, the samples in general comprise high amounts of water that might also evaporate to a higher extent and contaminate the sorbents in the trap. Thus, although it is possible to obtain suitable results without first optimizing the conditions, it is preferred to first evaluate the best conditions for each kind of sample.

In a preferred embodiment, the inventive method can be performed using an adapted HS-ITEX apparatus and a usual HS-ITEX needle as sampling means. In HS-ITEX applications the end of the flow channel distant from the second end of the trap is connected via a 2-ports/2-way valve to a nitrogen source. In DHS-VTT applications the adaptation comprises that said end of the flow channel is connected via a 3-ports/2-way valve to an inert gas source on the one hand and to a vacuum pump on the other hand thereby allowing ready switch between the two possibilities. A preferred valve comprises a 3-ports distribution block.

As in HS-ITEX methods also for DHS-VTT a preferred inert gas is nitrogen, in particular due to its availability and low costs.

Herein, if trapping the volatile compounds on (in) the one or more sorbents in the trap a low temperature is preferred, and desorption of the trapped compounds at a high temperature is preferred, the sampling means may further comprises heating and/or cooling means at least in the trap area.

In a further preferred embodiment the programmed temperature vaporizing injector (PTV) temperature in steps (v) and (vi) is in a range of −10 to 20° C., preferably about 10° C.

In yet a further preferred embodiment the at least one sorbent in the trap is a combination of at least two sorbents present in the trap in mixed or layered form.

A suitable desorption temperature in the trap in general is in a range of 150 to 450° C., preferably 200 to 350° C. and/or the desorption flow of inert gas, like nitrogen is 100 to 250 mL min$^{-1}$, preferably 150 to 230 mL min$^{-1}$.

BRIEF DESCRIPTION OF THE DRAWINGS

The invention will be better understood and objects other than those set forth above will become apparent when consideration is given to the following detailed description thereof. This description makes reference to the annexed drawings, wherein:

FIGS. 1a, 1b, 1c and 1d. Comparison between DHS-VTT with different sorbent materials, HS-ITEX TTA and HS-SPME for the investigated compounds of groups 1 to 3, in which FIGS. 1a and 1b show the values for groups 1 and 2 and FIGS. 1c and 1d show the values for group 3. The values represented are the total ion count (TIC) [−] for the MS signal.

DETAILED DESCRIPTION OF THE EMBODIMENTS

Figure 1A:
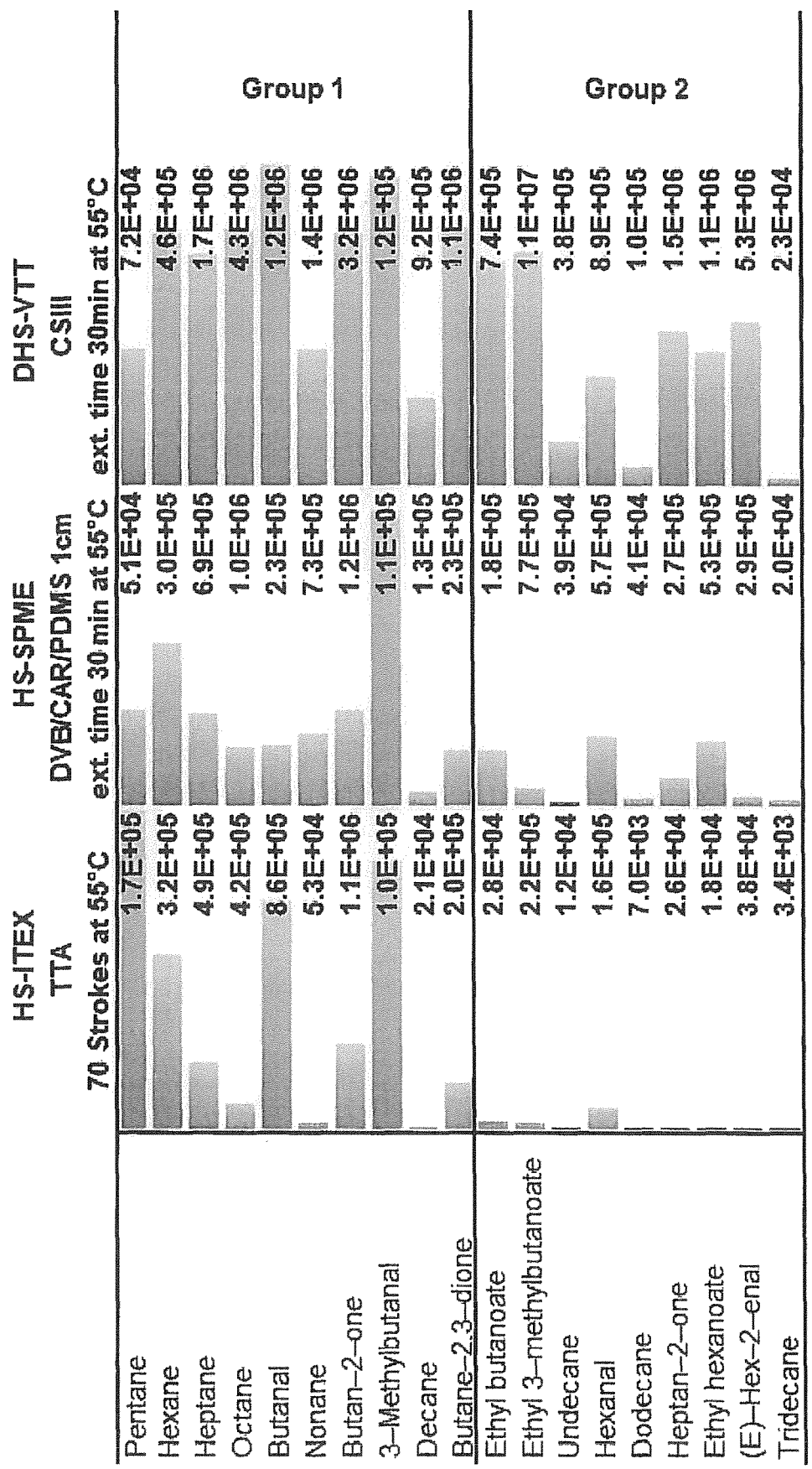
Figure 1B:
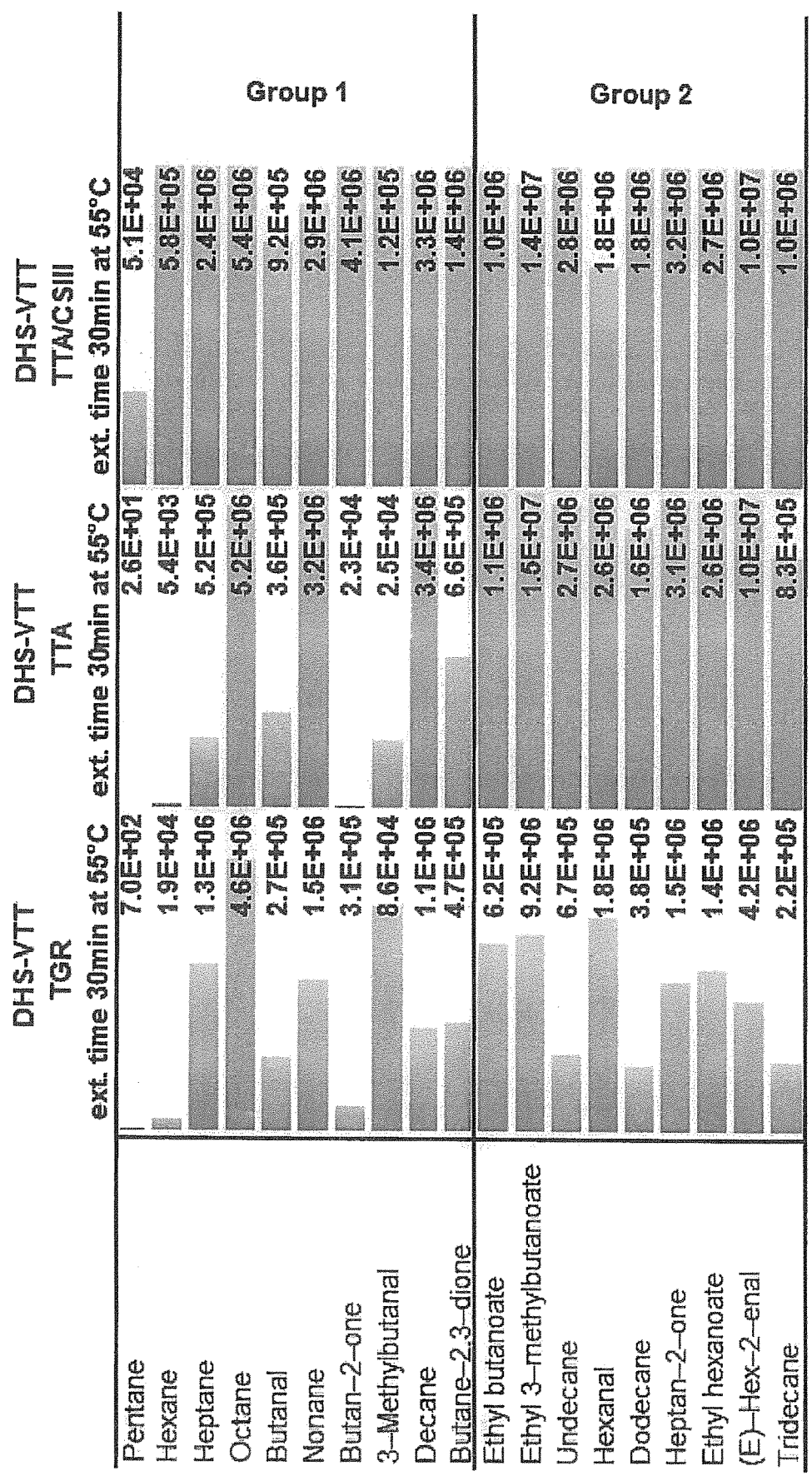
Figure 1C:
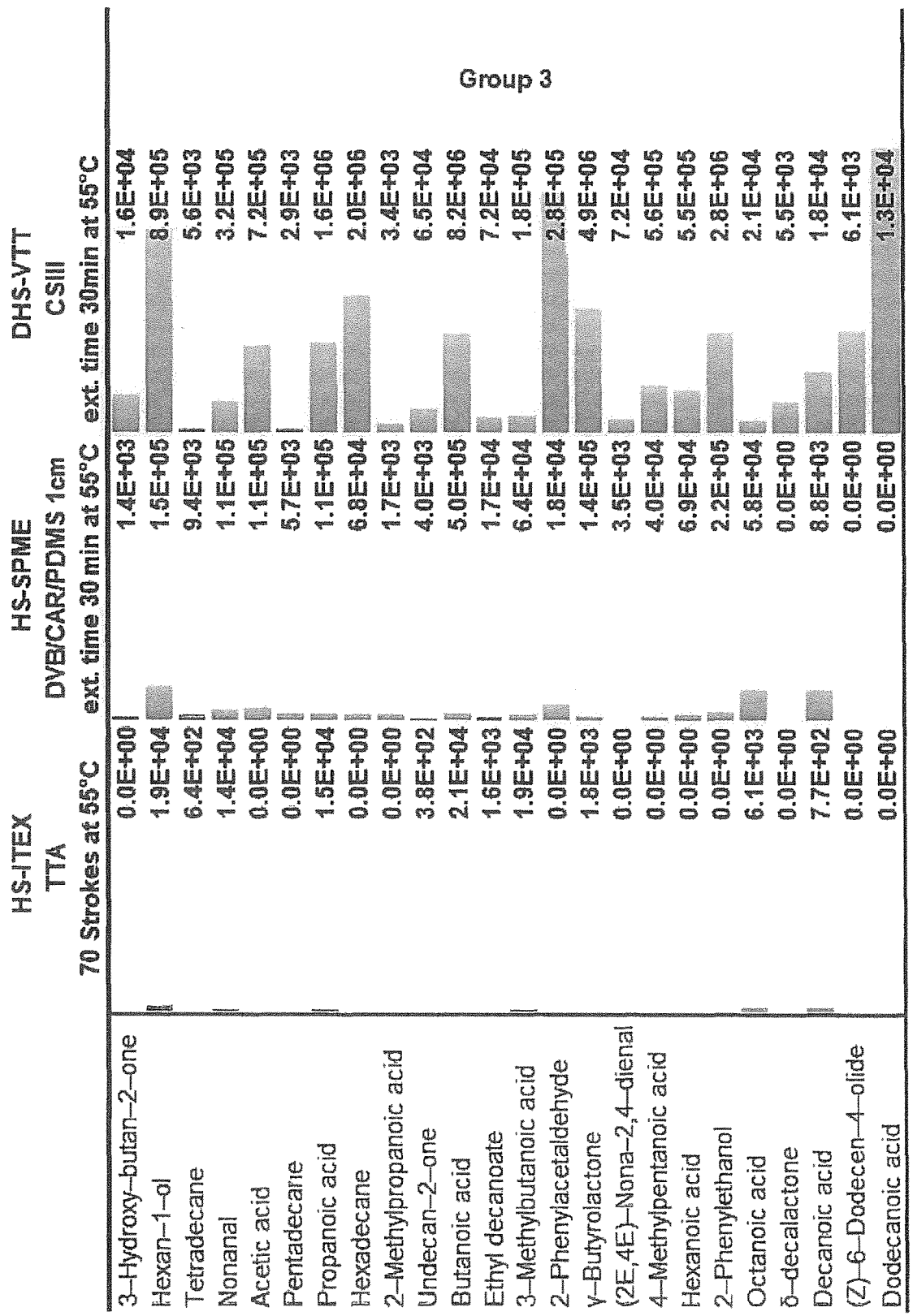
Figure 1D:
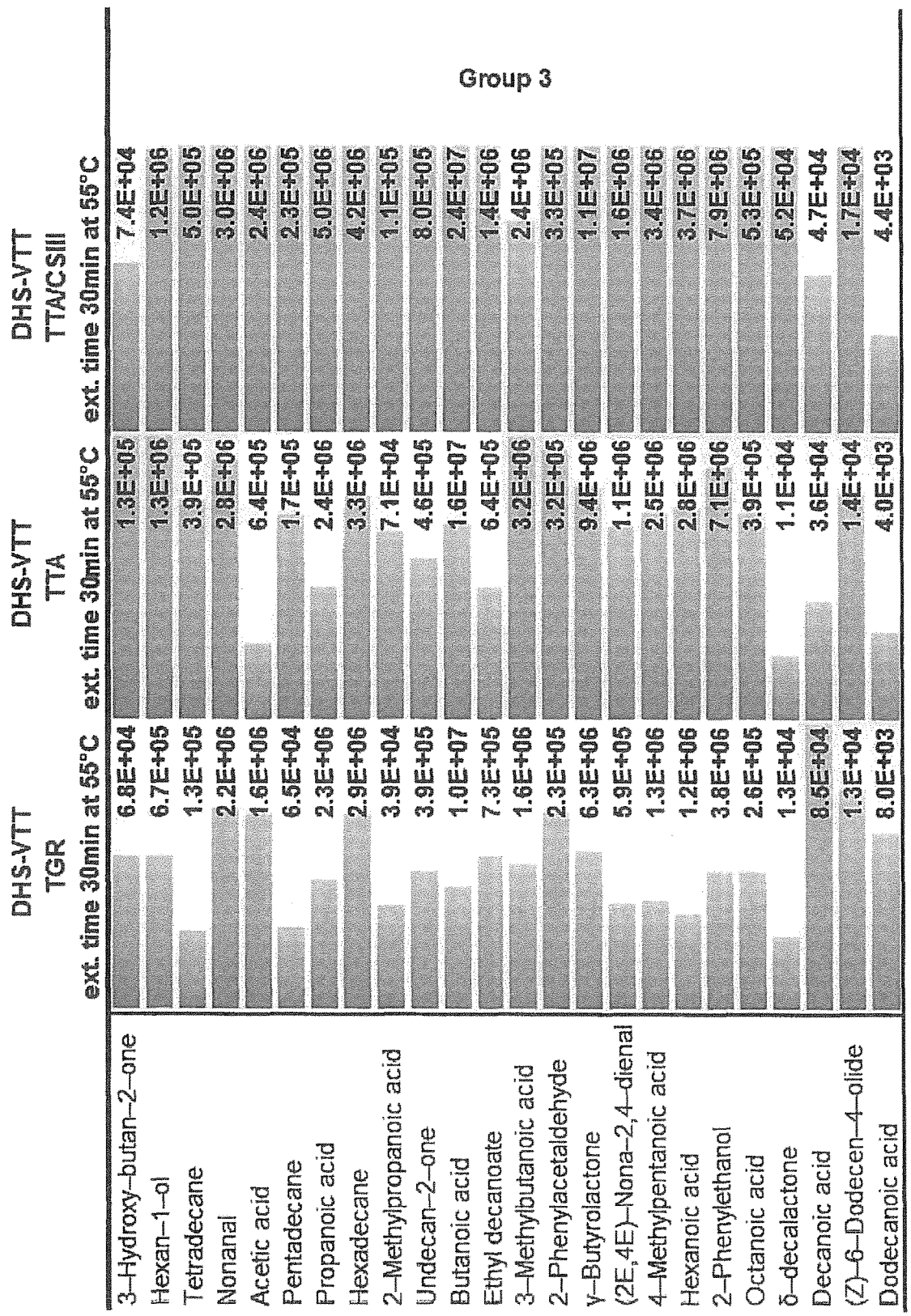

For the development and application of the extraction technique, DHS-VTT, a model of an artificially constructed dairy matrix (ACM) was used. With this ACM the sensitivity was assessed and found to be suitable for qualitative and quantitative analysis of a large range of volatile compounds, small volume samples, and large sample series. The suitability and efficiency of DHS-VTT was verified by comparison to HS-SPME and HS-ITEX as well as analysis of ACM using parameters commonly found in the literature for HS-ITEX and HS-SPME [31].

The results obtained with this method show much improved sensitivity of target compounds. The area of the peaks was up to 450 times more intense than those obtained with HS-SPME and HS-ITEX techniques performed in the same experimental conditions of extraction temperature and time.

EXPERIMENTAL

1. Materials and Method
1.1. Chemicals

Chemical compounds were purchased from SigmaAldrich Chemie GmbH (Buchs, Switzerland), R. C. Treatt & Co. Ltd (Suffolk, United Kingdom) and Caesar & Loretz GmbH (Hilden, Germany): Hexan-1-ol (Aldrich 471402), 2-Phenylethanol (Aldrich 77861), Butan-2-one (Aldrich 360473), Butane-2,3-dione (Aldrich B85307), 3-Hydroxybutan-2-one (Aldrich W200808), Heptan-2-one (Aldrich W254401), Undecan-2-one (Aldrich W309311), Ethyl butanoate (Aldrich W242705), Ethyl 3-methylbutanoate (Aldrich W246301), Ethyl hexanoate (Aldrich W242906), Ethyl decanoate (Aldrich W243205), γ-Butyrolactone (Aldrich 90970), δ-Decalactone (Aldrich W236101), (Z)-6-Dodecen-4-olide (R. C. Treatt 62185), Butanal (Aldrich W221902), 3-Methylbutanal (Aldrich 146455), Hexanal (Aldrich 115606), (E)-Hex-2-enal (Aldrich W256005), 2-Phenylacetaldehyde (Aldrich W287407), Nonanal (Aldrich W278203), (2E,4E)-Nona-2,4-dienal (Aldrich W321206), Acetic acid 99.7% (Aldrich 695092), Propanoic acid (Aldrich P1386), 2-Methylpropanoic acid (Aldrich W222208), Butanoic acid (Aldrich W222119), 3-Methylbutanoic acid (Aldrich W310212), 4-Methylpentanoic acid (Aldrich W346306), Hexanoic acid (Aldrich W255904), Octanoic acid (Aldrich W279927), Decanoic acid (Aldrich W+236411), Dodecanoic acid (Aldrich 61609), Pentane (Aldrich 236705), Hexane (Aldrich 296090), Heptane (Aldrich 246654), Octane (Aldrich 296988), Nonane (Aldrich 296821), Decane (Aldrich 457116), Undecane (Aldrich W510505), Dodecane (Aldrich 297879), Tridecane (Aldrich T57401), Tetradecane (Aldrich 172456), Pentadecane (Aldrich P3406), Hexadecane (Aldrich 296317), Polyethylenglycol 200 (Aldrich P3015), Miglyol 812 (Caesar 3274), Sodium chloride >99% (Aldrich S9888), Phosphoric acid (Aldrich W290017).

1.2. ITEX Sorbent Materials

ITEX traps filled with Tenax® TA (TTA), Tenax® GR (TGR), Cabosieve S III (CSIII) and Cabosieve S III/Tenax® TA (CSIII/TTA) were purchased from BGB analytik AG, Boeckten, Switzerland.

1.3. Artificially Constructed Matrix (ACM)

In order to develop and optimize the DHS-VTT technique, a stable sample representative of a dairy matrix was created using 43 target compounds (alcohols, ketones, aldehydes, alkanes, carboxylic acids and lactones; Table 1), diluted to a concentration of 10 mg $L^{-1}$ in 20 mL of polyethyleneglycol 200. The alkanes were separately diluted in Miglyol® 812 at the same concentration. These mixtures were stored at −40° C. until analysis. A total of 25 µl of each standard solution was added to 2 mL of $H_3PO_4$ 4% in deionized water and placed in 20 mL HS vials (Interchim, Montluçon, France). Vials were hermetically sealed with a blue silicone/Teflon septum (Interchim). Calibration curves were made by diluting the stock solution by a factor of two for a minimum of seven points. To facilitate data processing, the 43 compounds were classified into three groups: group 1 spanning over C5 and C10, group 2 spanning over the first pic right after C10 and C13, and group 3 spanning over the first pic right after C13 and C20 (Table 1 and FIG. 1).

TABLE 1

GC/MS detection parameters for the investigated compounds and validation parameters of the DHS-VTT method.

| Compounds | Retention Time (min) | Quantifier ion (m/z) | Qualifier ion (m/z) | Calibration range (µg $L^{-1}$) | MDL (µg $L^{-1}$) | Mean $R^2$ | RSD (%) | Extraction ratios [%] | |
|---|---|---|---|---|---|---|---|---|---|
| Pentane | 5.4 | 72 | 43, 57 | 0.122-31.3 | 0.27 | 0.9989 | 9.4 | 56.2 | Group 1 |
| Hexane | 5.9 | 86 | 57, 71 | 0.0305-15.6 | 0.14 | 0.9981 | 8.2 | 50.0 | |
| Heptane | 7.0 | 100 | 57, 71 | 0.0153-7.81 | 0.17 | 0.9996 | 6.8 | 38.1 | |
| Octane | 9.0 | 114 | 71, 85 | 0.0153-7.81 | 0.11 | 0.9995 | 5.5 | 26.8 | |
| Butanal | 11.9 | 72 | 44, 57 | 0.488-15.6 | 1.12 | 0.9965 | 7.3 | 58.8 | |
| Nonane | 12.0 | 128 | 85, 99 | 0.0153-15.6 | 0.12 | 0.9994 | 6.5 | 23.0 | |
| Butan-2-one | 12.8 | 72 | 43, 57 | 0.122-125 | 0.49 | 0.9966 | 7.3 | 77.8 | |
| 3-Methylbutanal | 13.3 | 86 | 58, 71 | 0.244-500 | 0.23 | 0.9999 | 4.9 | 69.3 | |
| Decane | 15.4 | 85 | 99, 113 | 0.00763-3.91 | 0.05 | 0.9994 | 7.8 | 23.1 | |
| Butane-2,3-dione | 15.4 | 86 | 43 | 0.488-500 | 1.71 | 0.9999 | 7.8 | 31.9 | |

TABLE 1-continued

GC/MS detection parameters for the investigated compounds
and validation parameters of the DHS-VTT method.

| Compounds | Retention Time (min) | Quantifier ion (m/z) | Qualifier ion (m/z) | Calibration range (µg L$^{-1}$) | MDL (µg L$^{-1}$) | Mean R$^2$ | RSD (%) | Extraction ratios [%] | |
|---|---|---|---|---|---|---|---|---|---|
| Ethyl butanoate | 17.4 | 116 | 88, 101 | 0.00191-1.95 | 0.01 | 0.9994 | 8.4 | 48.4 | Group 2 |
| Ethyl 3-methylbutanoate | 18.4 | 85 | 115, 130 | 0.00191-3.91 | 0.00 | 0.9999 | 7.4 | 40.6 | |
| Undecane | 18.9 | 71 | 113, 127 | 0.122-15.6 | 0.26 | 0.9999 | 9.8 | 21.4 | |
| Hexanal | 19.2 | 82 | 56, 72 | 0.244-7.81 | 2.89 | 0.9962 | 14.5 | 60.4 | |
| Dodecane | 22.2 | 85 | 127, 141 | 0.0153-0.977 | 0.08 | 0.9999 | 13.2 | 23.8 | |
| Heptan-2-one | 22.6 | 114 | 58, 71 | 0.0305-1.95 | 0.30 | 0.9988 | 4.7 | 45.5 | |
| Ethyl hexanoate | 24.0 | 99 | 88, 144 | 0.00763-0.488 | 0.05 | 0.9992 | 6.5 | 36.1 | |
| (E)-Hex-2-enal | 24.2 | 98 | 69, 83 | 0.0610-15.6 | 0.07 | 0.9991 | 3.0 | 72.9 | |
| Tridecane | 25.3 | 85 | 141, 155 | 0.0153-31.3 | 0.04 | 0.9993 | 14.0 | 23.6 | |
| 3-Hydroxy-butan-2-one | 26.3 | 45 | 43, 88 | 3.91-250 | 12 | 0.9987 | 11.0 | 18.2 | Group 3 |
| Hexan-1-ol | 27.4 | 84 | 56, 69 | 0.244-7.81 | 0.13 | 0.9939 | 2.2 | 55.1 | |
| Tetradecane | 28.3 | 198 | 155, 169 | 0.0610-31.3 | 0.26 | 0.9994 | 15.5 | 19.6 | |
| Nonanal | 29.1 | 98 | 95, 124 | 0.0610-7.81 | 0.93 | 0.9936 | 33.0 | 36.4 | |
| Acetic acid | 30.6 | 60 | 43, 45 | 31.3-1000 | 104 | 0.9986 | 27.6 | 50.1 | |
| Pentadecane | 31.0 | 212 | 169, 184 | 0.244-31.3 | 0.82 | 0.9997 | 15.8 | 15.5 | |
| Propanoic acid | 32.9 | 74 | 57, 73 | 31.3-1000 | 53 | 0.9988 | 28.6 | 52.1 | |
| Hexadecane | 33.6 | 226 | 197, 183 | 0.244-62.5 | 4.6 | 0.9997 | 15.5 | 37.0 | |
| 2-Methylpropanoic acid | 34.0 | 88 | 43, 73 | 0.244-125 | 0.19 | 0.9994 | 14.7 | 15.4 | |
| Undecan-2-one | 34.5 | 170 | 85, 112 | 0.0610-125 | 0.15 | 0.9981 | 9.0 | 33.5 | |
| Butanoic acid | 35.1 | 73 | 60, 88 | 0.488-125 | 0.74 | 0.9990 | 6.1 | 31.6 | |
| Ethyl decanoate | 35.2 | 101 | 143, 115 | 0.0153-1.95 | 0.06 | 0.9983 | 8.1 | 31.0 | |
| 3-Methylbutanoic acid | 36.2 | 87 | 60, 69 | 0.244-62.5 | 1.22 | 0.9987 | 14.0 | 17.7 | |
| 2-Phenylacetaldehyde | 36.5 | 120 | 91, 92 | 0.0153-15.6 | 0.20 | 0.9990 | 12.8 | 43.2 | |
| γ-Butyrolactone | 36.6 | 86 | 42 | 7.81-1000 | 72 | 0.9898 | — | 10.7 | |
| (2E,4E)-Nona-2,4-dienal | 37.6 | 138 | 138, 95 | 0.122-125 | 0.24 | 0.9991 | 28.4 | 40.7 | |
| 4-Methylpentanoic acid | 39.3 | 83 | 101, 73 | 0.122-62.5 | 3.12 | 0.9968 | 10.3 | 18.5 | |
| Hexanoic acid | 40.2 | 87 | 87, 73 | 7.81-1000 | 64 | 0.9992 | 20.4 | 17.1 | |
| 2-Phenylethanol | 42.4 | 122 | 91, 92 | 0.00763-15.6 | 0.03 | 0.9997 | 6.9 | 45.5 | |
| Octanoic acid | 45.3 | 101 | 115, 144 | 15.6-1000 | 59 | 0.9942 | 28.6 | 3.1 | |
| 5-decalactone | 52.2 | 99 | 114, 134 | 0.0305-62.5 | 0.13 | 0.9971 | 13.1 | 39.9 | |
| Decanoic acid | 52.8 | 73 | 129, 143 | 15.6-1000 | 65 | 0.9985 | — | 3.6 | |
| (2)-6-Dodecen-4-olide | 62.4 | 85 | 96, 136 | 0.00381-0.244 | 0.1 | 0.9987 | 43.8 | 25.3 | |
| Dodecanoic acid | 65.3 | 60 | 96, 136 | 31.3-1000 | 43 | 0.9901 | 9.4 | 1.0 | |

1.4. Modification of the Gas Distribution Block

Figure 2A:
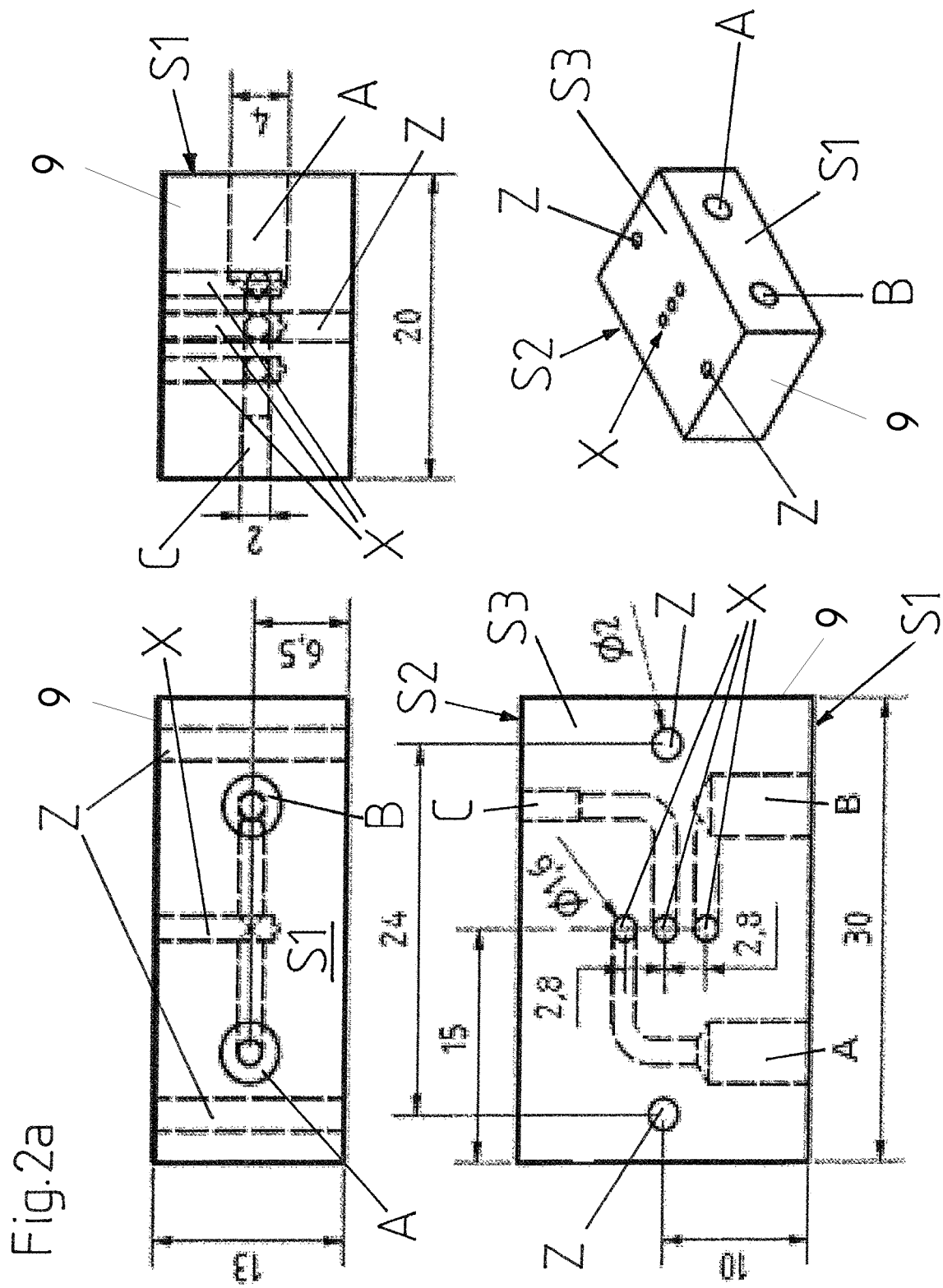
FIG. 2a. Design of the modification of the gas distribution block in side view, in front view, in top view and in a perspective view.

The original two-way aluminum gas distribution block for the gas flush electro valve of the autosampler MPS2 (Gerstel, Sursee, Switzerland) was replaced by a three-way polymer block printed on a 3D Touch Pegasus printer (Full Spectrum Laser, Las Vegas, US) with "Universal Clear Resin" (Full spectrum Laser). The polymer was solidified by UV exposure after printing. As can be seen in FIG. 2a (dimensions are in mm, and hidden edges are depicted in dashed lines), the new gas distribution block 2 is designed with three ports A, B, C, namely one port A for the nitrogen supply 12, one port B for the vacuum 11 and one port C for the autosampler 1 (see FIG. 10). It is ashlar-shaped and the ports A, B, C, which are arranged at opposite sides S1, S2 of the block 9, end in three circular openings X in the center area of the top side S3 of said gas distribution block, where they are arranged in line with an equal spacing of about 2.8 mm between the centers of the openings X. The gas distribution block 2 further comprises two through bore-holes Z, for fastening a bracket (see FIG. 2c) on its top side S3 using fastening screws, which bracket in intended use attaches the valve 10 (see FIG. 10) to the gas distribution block 9.

Figure 2B:
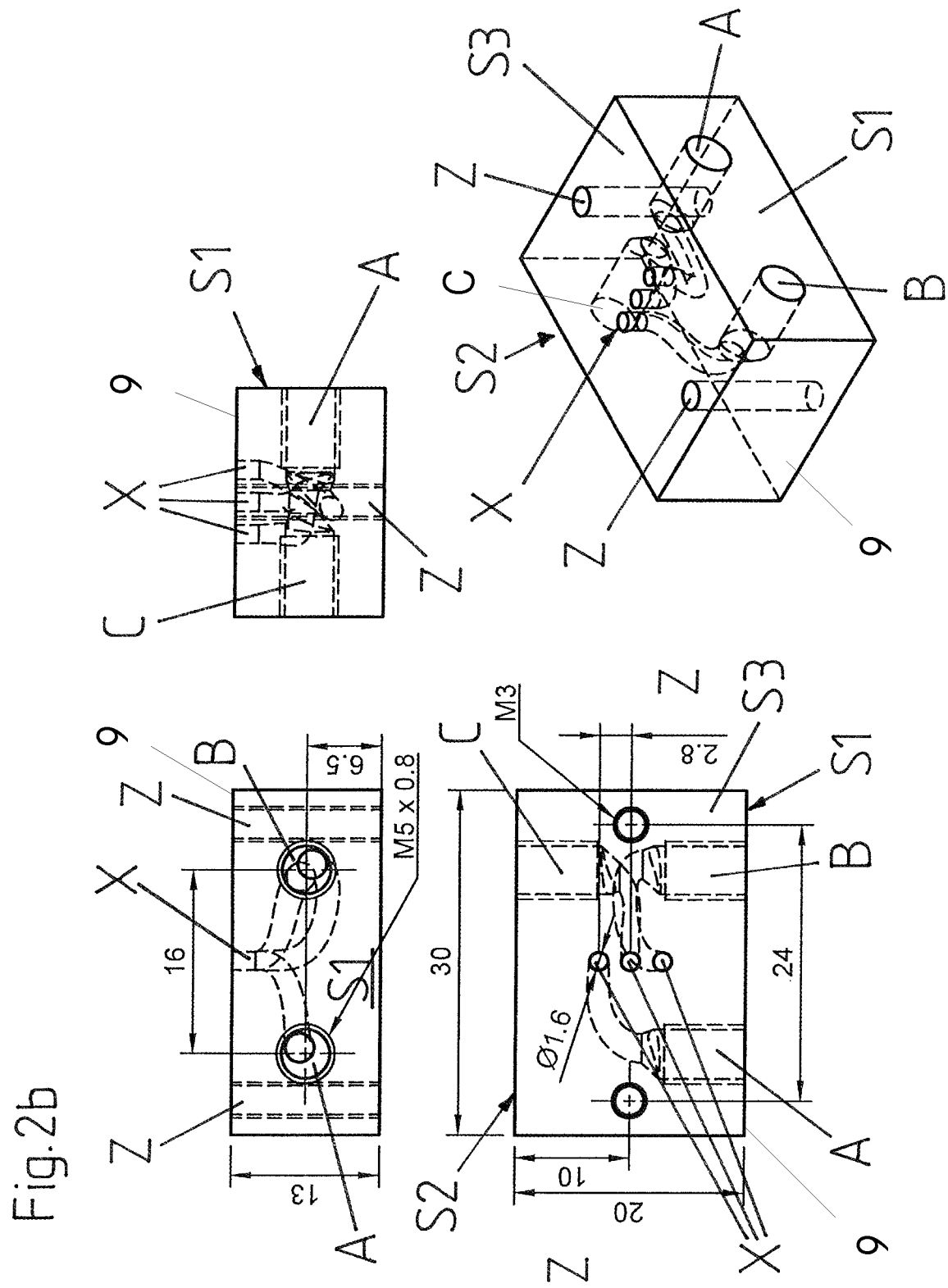
FIG. 2b. Alternative design of the modification of the gas distribution block in side view, in front view, in top view and in a perspective view.

FIG. 2b shows an alternative design of the modification of the gas distribution block 2 in side view, in front view, in top view and in a perspective view. This alternative design merely differs from the design shown in FIG. 2a in that the ducts connecting the ports A, B, C with the circular openings X in the top side S3 of the distribution block 9 are optimised in shape for minimum length and in that all ports A, B, C are of identical size.

Figure 2C:
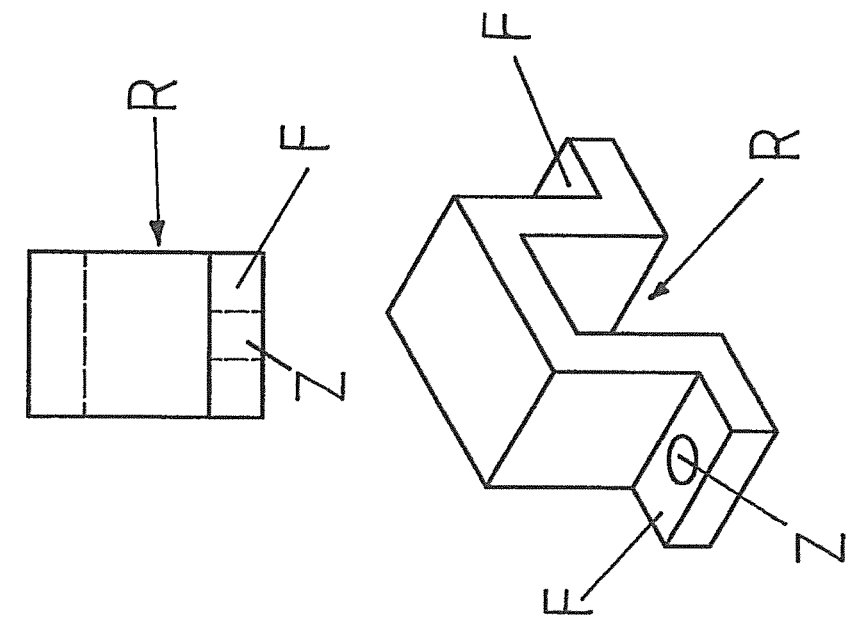
FIG. 2c. Design of the bracket for attaching the valve to the gas distribution block.
Figure 2C:
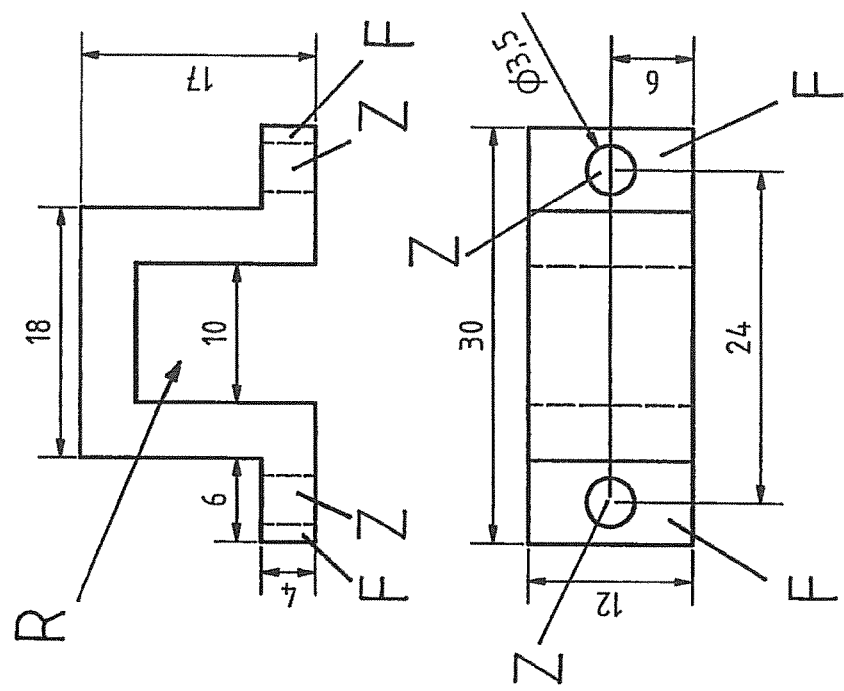

FIG. 2c shows the design of a bracket for attaching the valve 10 (again see FIG. 10) to the gas distribution block 9 according to FIG. 2a or FIG. 2b in side view, in front view, in top view and in a perspective view. As can be seen, the bracket is substantially U-shaped, thereby defining a rectangular space R for receiving the valve 10. The free ends of the U-shape of the bracket are formed by fastening flanges F, each providing a through bore-hole Z. In intended use, the valve 10 is received in the space R of the bracket and is mounted with the bracket to the top side S3 of the gas distribution block 2 in such a manner that the ports of the valve 10 communicate with the circular openings X and thus with the ports A, B, C of the gas distribution block. For fastening, the through bore-holes Z in the fastening flanges F of the bracket are aligned with the through bore-holes Z in the distribution block 2 and subsequently fastening screws are introduced into the aligned bore-holes Z for fastening the bracket with the valve 10 to the gas distribution block 9.

The above described modification makes it possible to convert the original 2-port/2-way gas flush electro valve of the autosampler MPS2 into a 3-port/2-way valve which switches from flow of nitrogen—as in HS-ITEX—to a vacuum pump in order to extract volatile compounds from the sample and subsequently desorbing them into the injector by switching the valve back to inert gas (nitrogen) flow.

The pressure in the vials was measured using a pressure sensor connected to a needle which pierced the septum of the vials at the same time that the extraction was performed. The signal was recorded simultaneously on the integrated software.

2. Instrumentation for GC-MS Analysis

The analyses were completed using an MPS2 autosampler (Gerstel) on an Agilent 7890B GC system coupled to an Agilent 5977A mass selective detector (MSD) (Agilent Technology, Santa Clara, CA, USA). The headspace was extracted according to the experimental design (Table 2). Bound volatiles were desorbed in a PTV (programmed temperature vaporizer) of type CIS 4 (Gerstel) and then separated on a TRB-FFAP fused silica capillary column (100% PEG with nitroterephthalic acid, bonded and cross-linked, 60 m×0.32 mm×1.0 µm film; Teknokroma, Barcelona, Spain) with helium as the carrier gas at a constant flow of 2.5 mL min$^{-1}$ (30 cm sec$^{-1}$).

TABLE 2

Two-level full factorial design of experiment for the method validation. Changed parameters: sample temperature (37° C. to 80° C.) and extraction time (5 to 60 minutes)

| Design | Sample temperature [° C.] | Extraction time [min] |
|---|---|---|
| 1 | 37 | 13 |
| 2 | 37 | 52 |
| 3 | 73 | 13 |
| 4 | 73 | 52 |
| 5 | 30 | 33 |
| 6 | 80 | 33 |
| 7 | 55 | 5 |
| 8 | 55 | 60 |
| 9 | 55 | 33 |
| 10 | 55 | 33 |
| 11 | 55 | 33 |
| 12 | 55 | 33 |

The oven temperature program was as follows: 5 min at 40° C., then heated to 220° C. at a rate of 5° C. min$^{-1}$ with a final hold time of 34 min to make a total run time of 75 min. The MS settings were as follows: transfer line at 230° C., source temperature at 230° C., the compounds were monitored in SCAN mode between 29 amu and 250 amu without solvent delay, and in SIM mode for the method detection limits (MDLs) and the calibration curves. The autosampler was controlled with the Cycle Composer V. 1.5.4 (CTC Analytics, Zwingen, Switzerland) and the PTV injector with Maestrol software V.1.4.8.14/3.5 (Gerstel). The detector response signals were integrated using Masshunter quantitative Analysis software version B.08.00 (Agilent). The NIST/EPA/NIH mass spectral library (NIST14) version 2.2 (NIST, Gaithersburg, MD, USA) was used for peak identification.

2.1. Headspace In-Tube Extraction (HS-ITEX)

The ITEX-2 option (Brechbühler, Schlieren, Switzerland) was used on the MPS2 autosampler. The headspace was extracted using a TTA trap with 70 extraction strokes (volume of 1.3 mL/stroke, extraction flow rate of 100 µl s$^{-1}$). The syringe temperature was fixed at 40° C., the ITEX trap at 35° C., and the sample at 55° C. Bounded volatiles were desorbed from the sorbent material at the supplier's temperature recommendation (300° C.) in the CIS4 injector equipped with a glass liner filled with TTA at 10° C. A volume of 1.3 mL was transferred into the injector at a desorption flow rate of 100 µl s$^{-1}$, after having waited 30 s (plunger down) in the vent mode (50 mL 0 kPa). The injector was then heated at a rate of 12° C. s$^{-1}$ to 240° C. The purge flow to split vent was set at 300 mL min$^{-1}$ after 5 min. After injection, the ITEX needle was reconditioned according to the supplier's temperature recommendation (250° C.) for 15 min under a nitrogen flow of 220 mL min$^{-1}$.

2.2. Headspace Solid-Phase Microextraction (HS-SPME)

To obtain a representative evaluation of the volatile organic compounds (VOCs) of the samples, VOCs were extracted using a 1 cm 50/30 µm divinylbenzene/carboxen/polydimethylsiloxane (DVB/CAR/PDMS) StableFlex fiber (Supelco, Bellfonte, PA, USA). The fiber was conditioned according to the supplier's recommendations (270° C. for 60 min). The sample headspace was extracted for 30 minutes at 55° C. with an agitation rate of 250 rpm without preheating. Bound volatiles were desorbed for 1 min at 240° C. in the injector, which was in the splitless mode for 30 s before the split valve was opened (split flow=80 mL min$^{-1}$) [31].

2.3. Dynamic Headspace Vacuum Transfer in Trap Extraction (DHS-VTT)

A piece of cleaned cotton was added in the vial to avoid boiling and foaming. The HS was extracted under reduced pressure using a vacuum pump Buchi V-300 (Büchi, Flawil, Switzerland) and the gas distribution block according to the experimental design (Table 2) without agitation. Sorbent and syringe were dried under a nitrogen stream for 17 min at 220 mL min$^{-1}$ [32]. Bound volatiles were desorbed from the sorbent for 2 min with a nitrogen flow of 220 mL min$^{-1}$ at the temperature recommended by the supplier for the employed polymer (for e.g. Tenax TA the supplier indicates <300° C. and the actually used temperature was in a range of from 200 to 300° C.) in a PTV injector in the vent mode at 50 mL min$^{-1}$ and 0 kPa for 30 s. The Injector was equipped with a glass liner filled with TTA and cooled with liquid nitrogen at 10° C. The injector was then heated, at a rate of 12° C. sec$^{-1}$, to 240° C. The purge flow to split vent was set at 300 mL min$^{-1}$ after 5 min. The reconditioning of the trap was achieved in the same way as for the HS-ITEX method.

3. Experimental Design and Statistics

To optimize experimental parameters, a two-level full factorial design of experiment was performed. Only the sample temperature and the time of extraction were investigated. It was considered that the temperature of the trap should be maintained as low as possible (within the constraints of instrument specifications and the laboratory environment) and the syringe temperature kept at 100° C. to exclude water condensation during the extraction. Three centrally composed DHS-VTT experimental plans were developed. The respective results can be presented as Mosaic plots (X axis: Sample temperature [° C.]. Y axis: Extraction time [min]. Z axis: Total ion count normalized [-]. The total ion account can be presented as color variations and each area of effect can be smoothed squarely (smoothing method)). Parameter optimization was made according to the experimental design for DHS-VTT (TTA/CSIII). The mean values of the measuring ranges were the center of the "Central Composite" design. The remaining levels were placed radially around the center in a $2*2^2$ experiment, which corresponds geometrically to two squares, rotated by 45° in the plane around their center. This design allows for the influence of five levels per parameter. Arranged at the same relative distance from the center, with only twelve measurements, the center point for the variability was measured four times.

4. Results and Discussion

4.1. Extraction and Injection Parameters

4.1.1. Pressure in the Headspace

Figure 3:
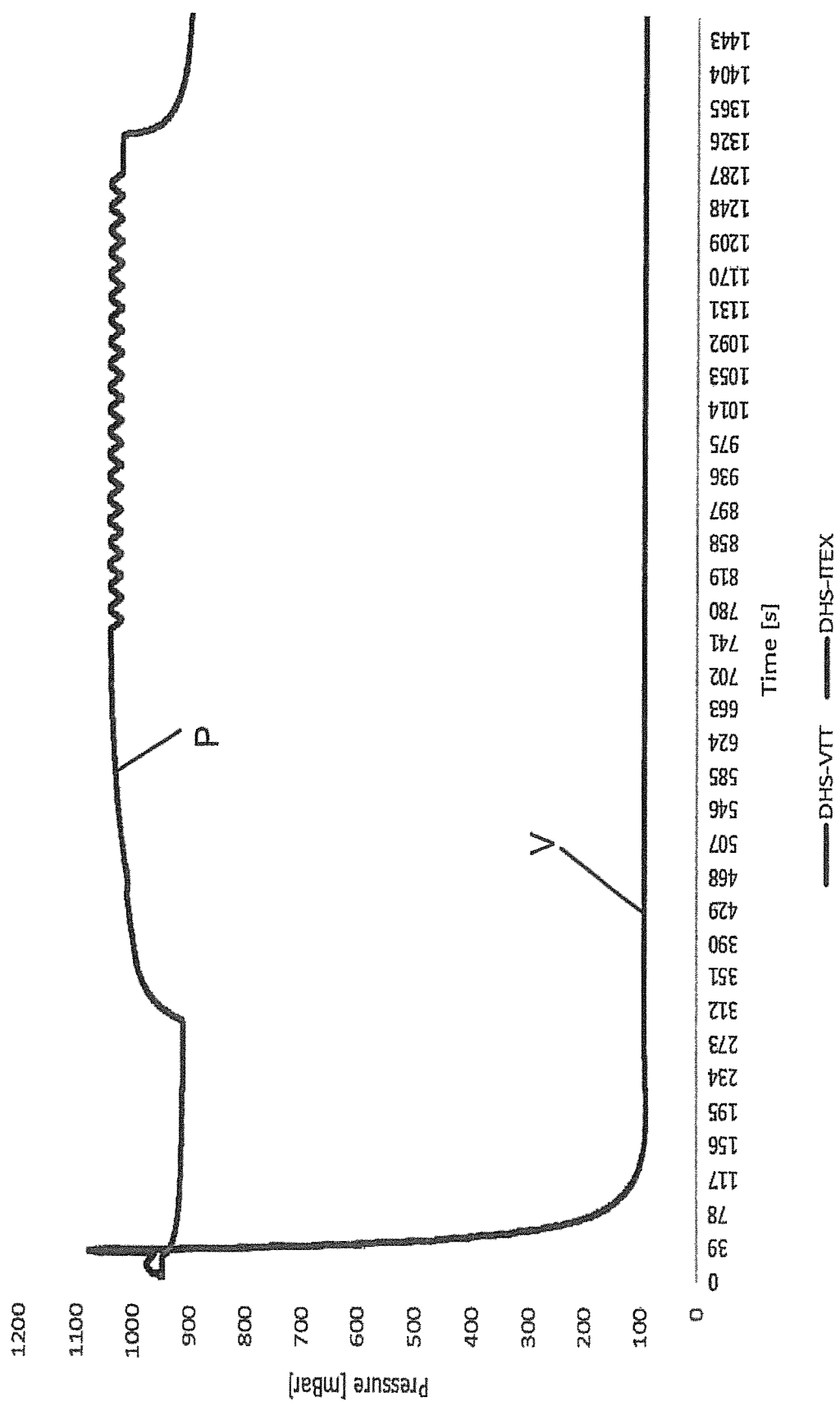
FIG. 3. Pressure inside the vials during the extraction using HS-ITEX (light gray) and DHS-VTT (dark gray) method.

The pressure measurements made during the extraction according to the HS-ITEX method show that the extractions were carried out above atmospheric pressure due to heat accumulating in the vial during extraction. This separated the partition coefficient of the molecules according to Henry's law [33]. Usually, the sample was prepared at atmospheric pressure before extraction. When placed in the autosampler cooling device (4° C.), the pressure immediately decreased due to the volume contraction of the air in the vials. Then the vial was placed in the heating agitator (55° C.) and the pressure largely increases above atmospheric pressure (FIG. 3, line P). Throughout the period of extraction, the high pressure remained constant. This phenomenon was similar during a HS-SPME extraction without strokes effect.

Figure 4:
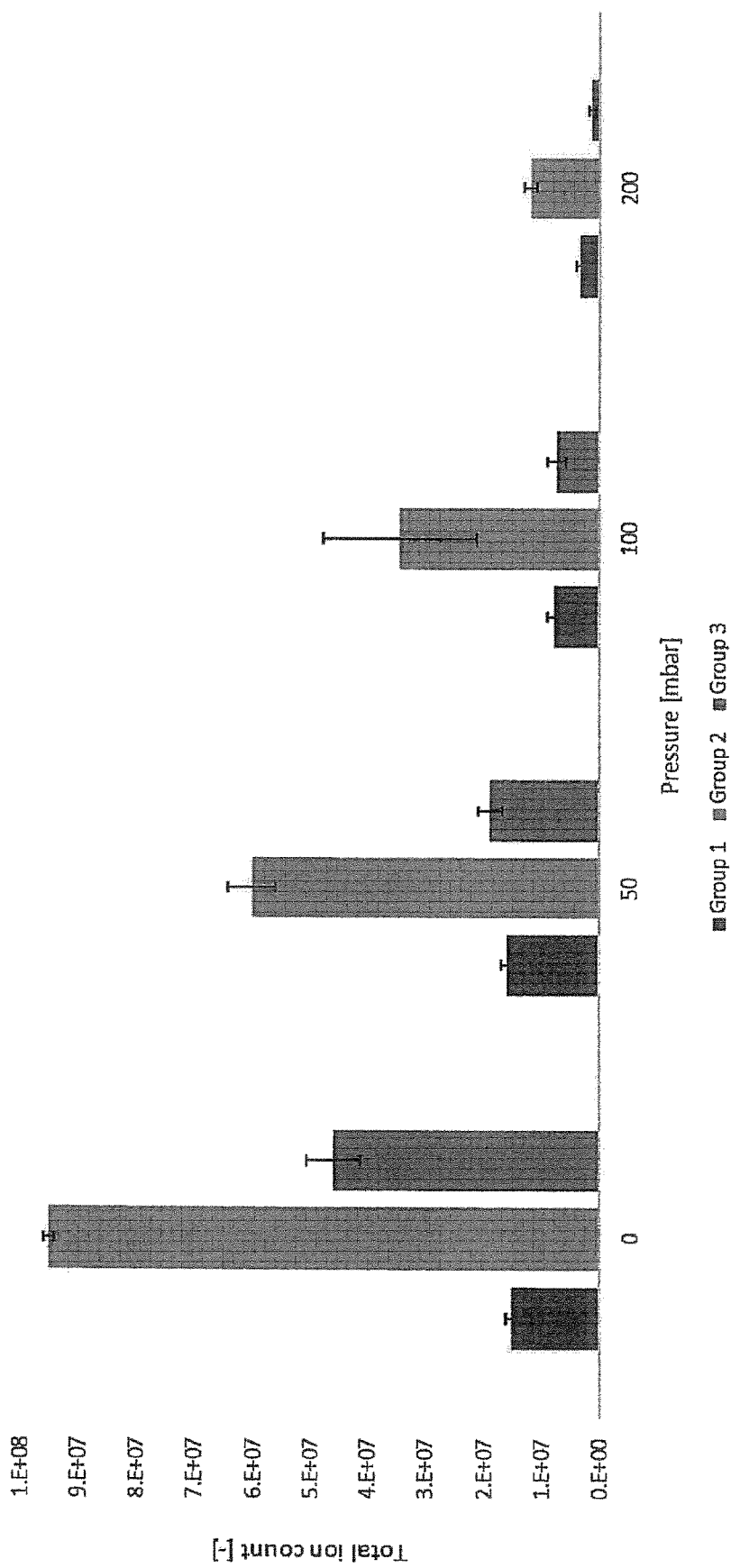
FIG. 4. Sum of the peak areas of the 43 target compounds divided into 3 groups (Y-Axis: Total ion count) as a function of the pressure in vials expressed in mbar (X-Axis).

With the change of the gas distribution block it was possible to automate the extraction at reduced pressure and to work at a constant pressure (about 100 mbar) in the vial throughout the entire extraction (FIG. 3, line V). The vacuum obtained in the vials greatly influences the extraction of volatile compounds [24]. A pressure above 100 mbar proved no longer sufficient to efficiently extract the compounds (FIG. 4). A reduced pressure accelerated the release of the volatile compounds into the headspace, but also reduced the efficiency of the sorbent. Hence, it was necessary to determine the optimal conditions to achieve a suitable compromise between the pressure in the vial and extraction rate. The pressure effects were found to depend on the volatility of the molecules. The highly volatile compounds were better retained on the polymer sorbent when the pressure in the vial was not less than about 50 mbar (FIG. 4), while other volatile compounds were more easily extracted at the lowest possible pressure. The effect of the reduced pressure during extraction caused an issue already known from the purge and trap technology, the accumulation of water vapor in the system (needle, syringe, tubes) and hence artefact formation [20, 32]. To avoid this, the trap and the syringe were dried under a nitrogen flow prior to injection into the injector. The nitrogen flow and the time of such flow can be optimized for a given sample by evaluating the retention of compounds of different volatility under different conditions.

4.1.2. Sample Volume and HS Volume

Figure 5:
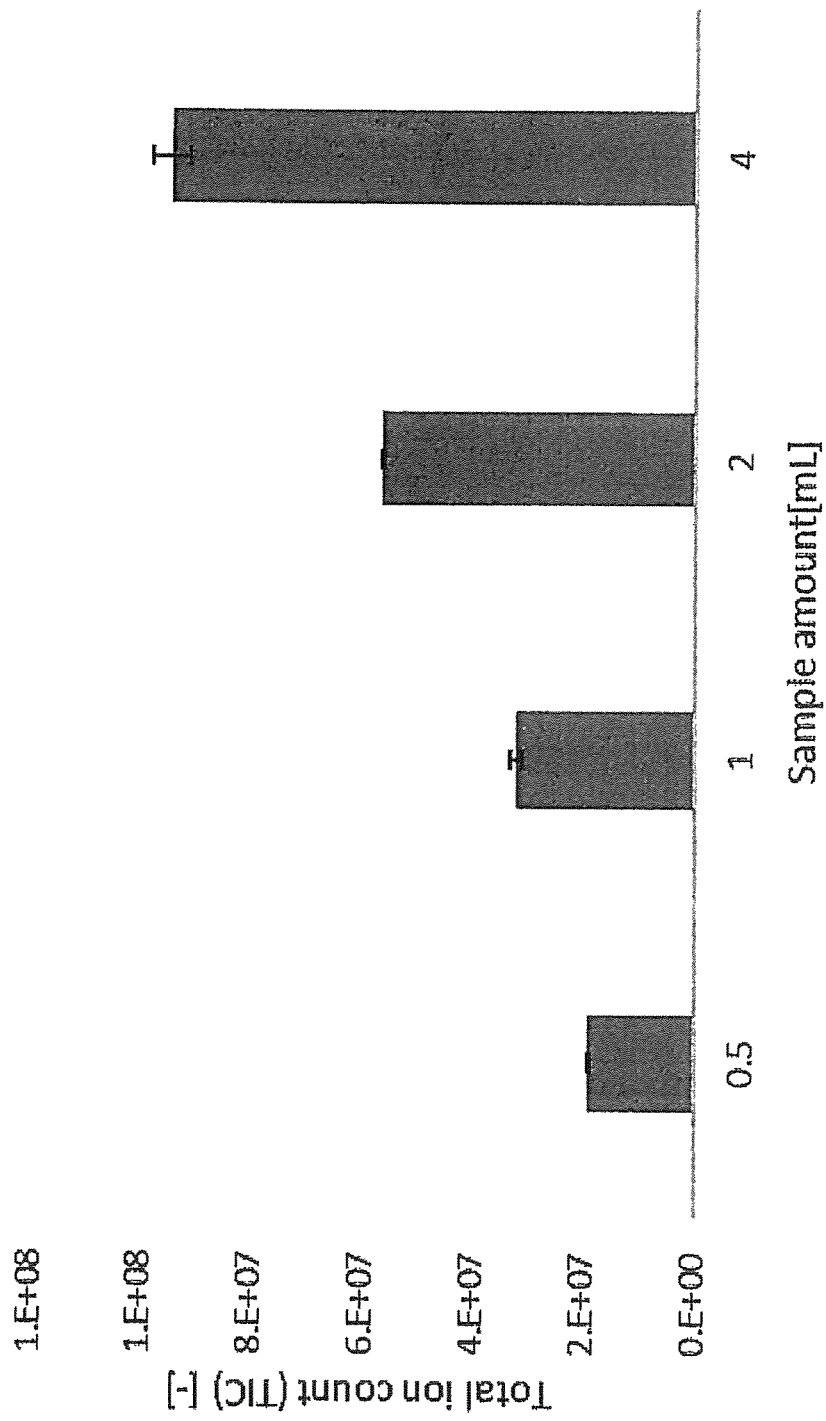
FIG. 5. Influence of sample amount on the total ion count (TIC) MS signal of the target compounds.

Tests were conducted with sample volumes of 0.5, 1, 2 and 4 mL in 20 mL HS vials. The DHS-VTT parameters were the same for each test. The amount of sample, hence the amount of volatile molecules available in the vials, has an important influence on the extraction. When the amount of sample doubles, the total signal increases proportionally by a factor of 1.7 for a given extraction time (FIG. 5). This demonstrates that the extraction capacity of the trap was not reached in the experiments performed and allows for quantitative studies with 2 mL sample [34, 35].

4.1.3. PTV Injector Temperature

Figure 6:
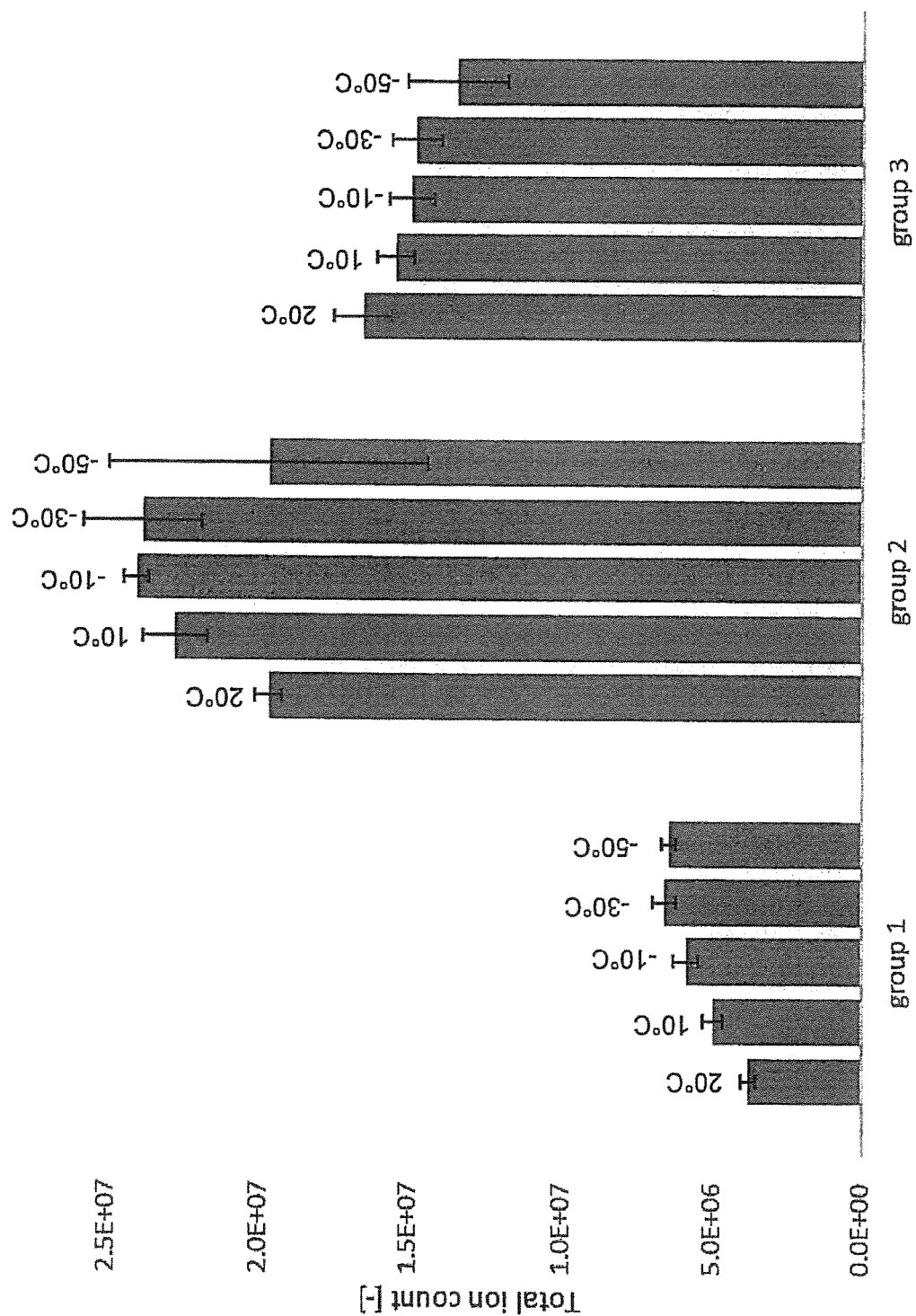
FIG. 6. Influence of the PTV injector temperature on the total amount for the investigated compounds. Injector temperatures between 20 and −50° C.

It was found that a low temperature had a positive impact on the recovery of highly volatile compounds (group 1). However, a temperature below 0° C. had a negative influence on the recovery of less volatile compounds from group 3. This variation may be due to a competitive effect on the polymer in the liner promoting absorption rather than adsorption. It was also found that the temperature range used did not influence the molecules of group 2. For the further experiments, a compromise was found at a temperature of 10° C. for the PTV (FIG. 6).

4.1.4. Sample Temperature and Extraction Time

The effect of the sample temperature was evaluated for temperatures between 30 and 60° C. using the described experimental design (Table 2). Increased temperature led to an increase in the signal for all compounds due to a higher partitioning of compounds from the aqueous phase to the headspace [1]. However, for highly volatile compounds, a higher temperature of the sample led to desorption of the compounds from the sorbent. For the less volatile compounds it was found that the higher the temperature, the higher the extraction efficacy. However, at certain high temperatures the compounds degraded and tended to contaminate the autosampler, i.e. the water vapor could condense in the trap, the syringe, and the autosampler tubes. Despite the hydrophobic nature of TTA, an accumulation of water in the trap can result in the problem of injecting water droplets into the GC with the injection of compounds [32].

With a reduced pressure in the vials, it was observed that the extraction rate was accelerated. For the most volatile compounds, a prolonged extraction time has a negative effect on the recovery of the molecules [1]. Indeed, it was found that if the extraction time is too long, the most volatile compounds are released from the sorbent. For the majority of molecules studied, the results of the experiments show an optimal time of 30 min at 55° C. For an optimized extraction of compounds from group 1, it is recommended to have the shortest extraction time (about 1 min) and a high temperature (about 80° C.) or an extended extraction time of 60 min and a sample temperature below 40° C.

4.1.5. Nitrogen Flow Desorption

Figure 7:
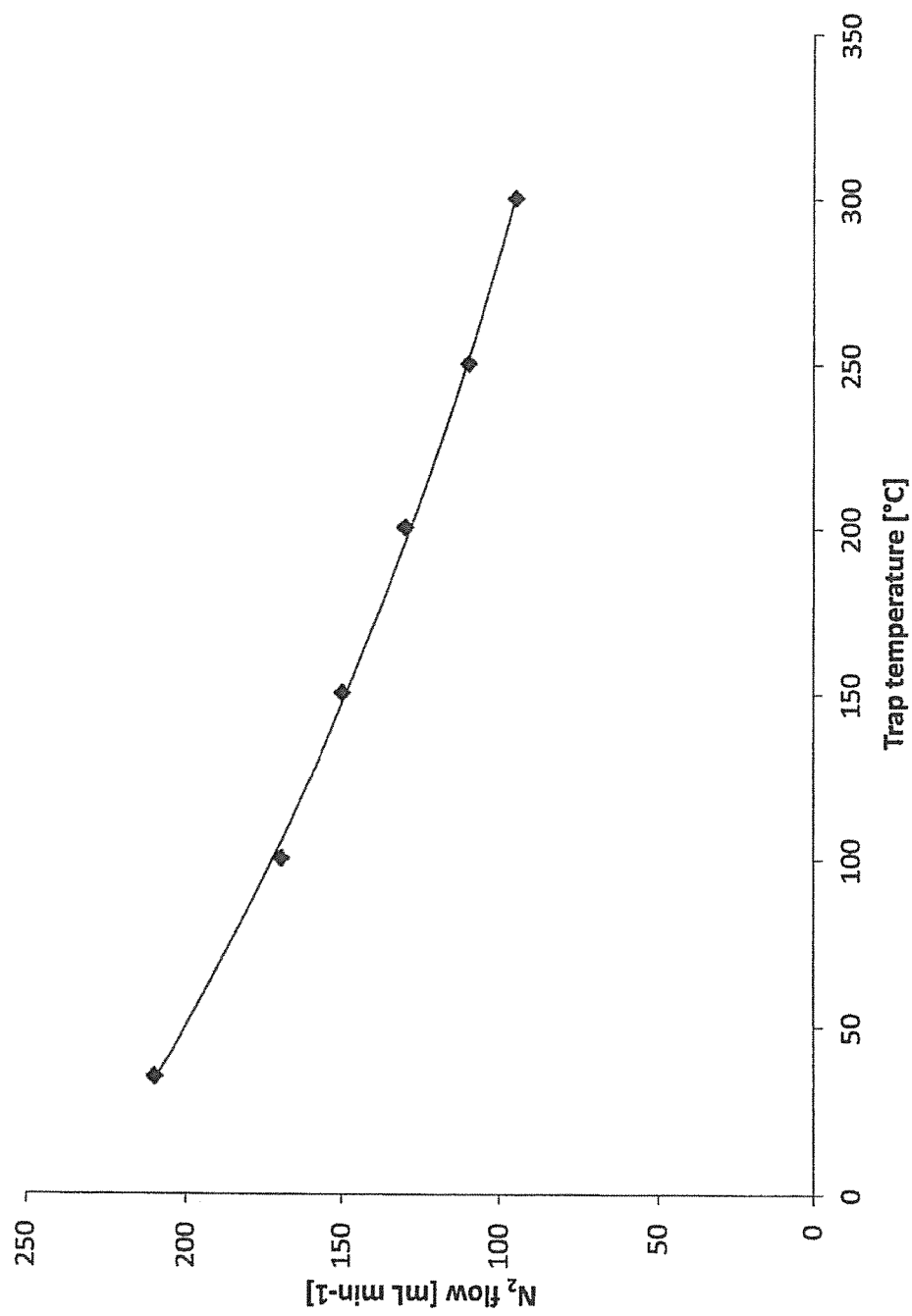
FIG. 7. Influence of the thermodesorption temperature on the nitrogen flow inside the ITEX trap FIG. 8. 850 injections of the ACM sample in DHS-VTT over a period of 2 weeks. Y-axis: Sum of surfaces of the 43 molecules selected. Standard deviation 9.6%

The nitrogen flow was optimized to 220 mL min$^{-1}$ at 35° C. to allow proper desorption of the compounds fixed to the sorbent polymer and extraction to counteract against the pressure into the injector during desorption. An exponential decrease in nitrogen flow rate was noted with increasing temperature of the trap (FIG. 7). It was observed that a flow that is too high (>300 mL min$^{-1}$) can clog the trap by sealing the sorbent material.

5. Comparison of the HS-SPME, HS-ITEX, and DHS-VTT

The results show that DHS-VTT clearly improves the extraction of volatile compounds as well as less volatile compounds from a complex matrix (FIG. 1). The peak area can be increased by a factor of 450 for some compounds in comparison with the HS-SPME method. In comparison, HS-SPME extraction, widely used in common headspace applications, achieves lower efficiency for all compounds measured under the same temperature and extraction time conditions. The DHS-VTT technique enables the gas phase to be enriched rapidly by limiting matrix effects thanks to the reduced pressure in the vial. Moreover, the conventional HS-ITEX method cannot extract the least volatile compounds and shows poor affinity with the matrix. The headspace is rapidly in a stable state in HS-ITEX and the strokes are inadequate to extract more volatile compounds.

The choice of polymer in the DHS-VTT extraction trap is also very important to optimize extraction. The best compromise for the 43 compounds in this study was a Tenax TA/Carbosieve SIII blend.

6. Method Validation of DHS-VTT

Method validation was carried out by determining the following parameters:

Linearity: The linearity ($R^2$) of the method was evaluated by measuring the target compounds in six different concentrations in the ACM corresponding to the ranks that are commonly found in dairy matrices. The $R^2$ was approximately 0.99+/− except for γ-Butyrolactone with 0.98.

Method detection limit (MDL): The MDL of target molecules was estimated according to the US Environmental Protection Agency procedure as defined in EPA 821-R-16-006 of December 2016, in J. A. Glaser, D. L. Foerst, G. D. McKee, S. A. Quave and W. L. Budde, Environ. Sci. Technol., 15 (1981) 1426 and the equation 1:

$$MDL = t_{(N-1, 1-\alpha=0.99)} \times S_c \quad (1)$$

where t is the student's t value with a confidence level of 99% and six degrees of freedom and $S_c$ the standard deviation of seven replicates at a concentration level featuring a signal-to-noise ratio (S/N) of three to one. The MDLs measured for alkanes were ranged from 0.036 µl L$^{-1}$ to 0.822 µl L$^{-1}$, for esters from 0.003 µl L$^{-1}$ to 0.071 µl L$^{-1}$, for aldehydes from 0.050 µl L$^{-1}$ to 2.89 µl L$^{-1}$, for ketones from 0.145 µl L$^{-1}$ to 11.9 µl for lactones from 0.130 µl L$^{-1}$ to 0.195 µl L$^{-1}$, for alcohols from 0.032 µl L$^{-1}$ to 0.127 µl L$^{-1}$ and for the acids from 0.741 µl L$^{-1}$ to 103 µl L$^{-1}$ (Table 1).

Reproducibility: The reproducibility (RSD %) was obtained by determining the relative standard deviation calculated on the analyses of samples eight times over a period of two weeks. Reproducibility was measured between 2.2 and 33% for all compounds (Table 1). Reproducibility was low for the carboxylic acids; the extraction conditions were not optimized for these compounds.

Extraction Ratio: The extraction ratio (E) of the method was evaluated by extracting the same sample five times. The E value was calculated according to Zimmermann et al, by plotting the logarithmical peak areas against the number of extraction and a simplified equation (2). [36] The slope of the linear regression is represented in the equation by the log (1−E).

$$\log n_{f,x} = \log(n_{s,0}E) + (x-1)\log(1-E) \quad (2)$$

The E value ranged from 1.0% for dodecanoic acid to 77.8% for butan-2-one.

Figure 8:
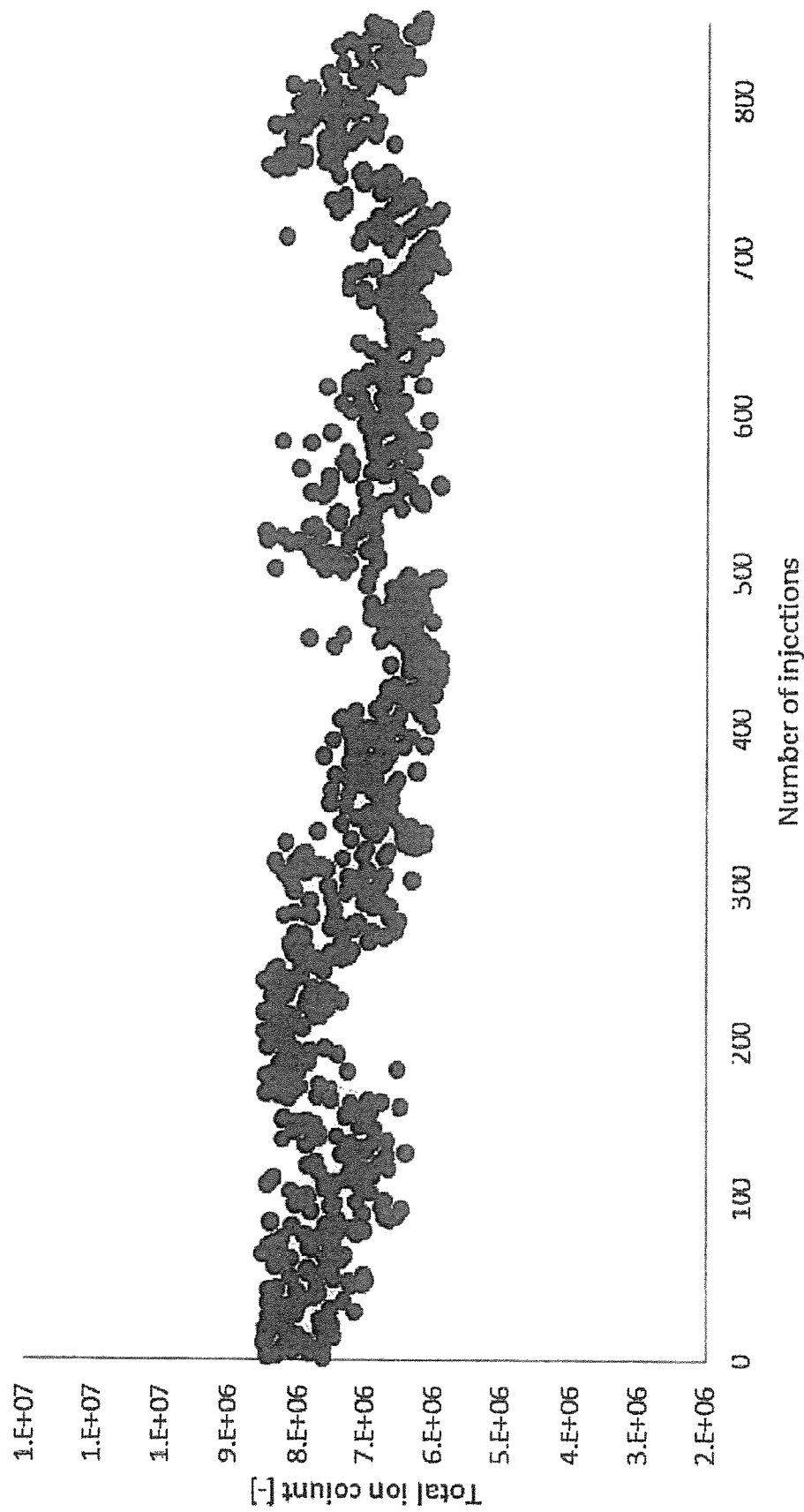

850 injections of ACM were made using always the same ITEX trap and the results show a reproducibility and a stability of the analyses with a maximum variation of 9.6% between the two extreme results (FIG. 8).

7. The Headspace Extraction Device

Figure 9:
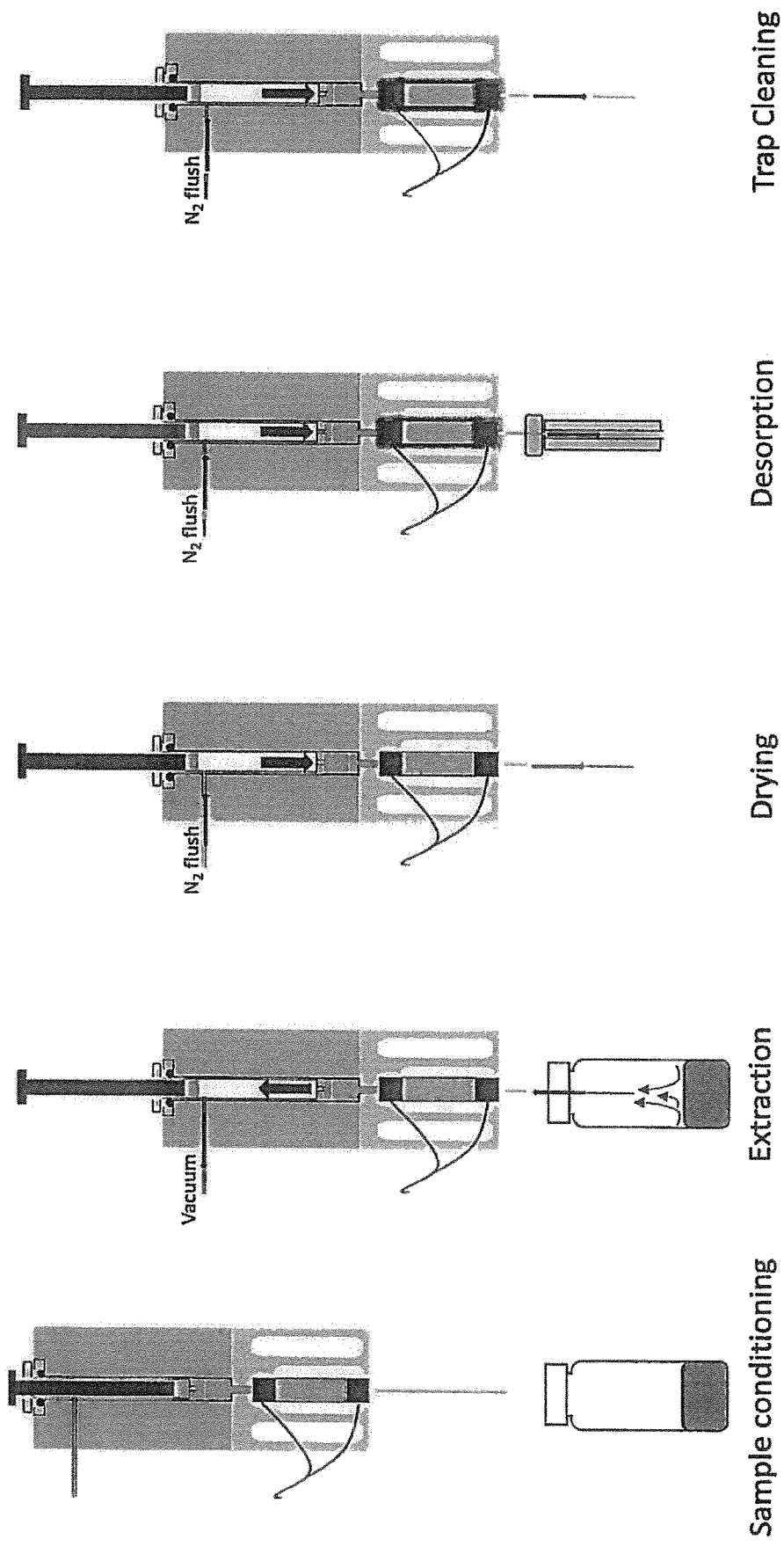
FIG. 9. Schematic steps of the DHS-VTT procedure: Sample conditioning through heating and "shaking" of the vial, extraction of volatile compounds by vacuum, drying with a stream of nitrogen, thermodesorption from heated trap using stream of nitrogen flushing into the injector, and trap cleaning using stream of nitrogen.
Figure 10:
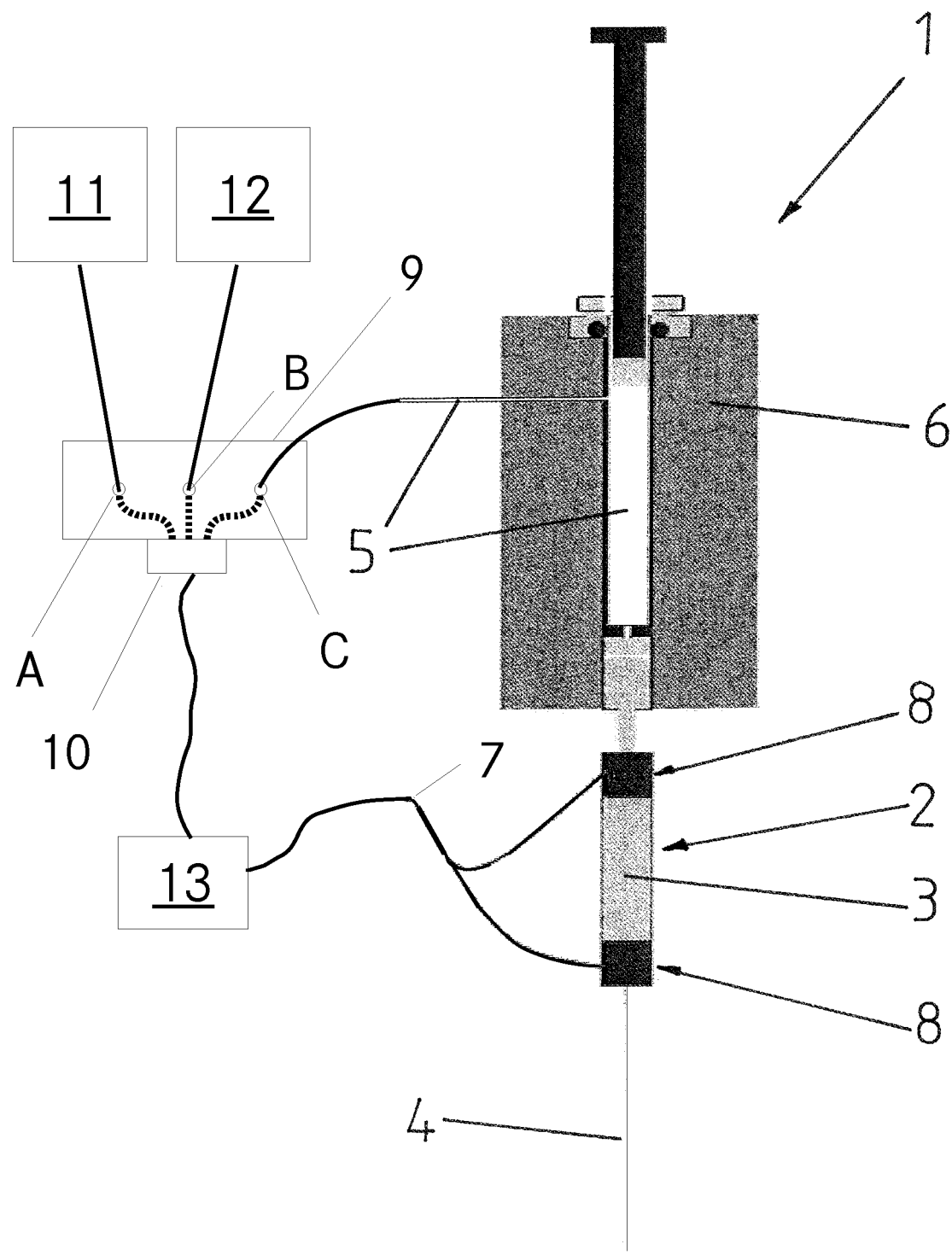
FIG. 10. The headspace extraction device according to the invention as used in a method as shown in FIG. 9.

FIG. 10 shows a headspace extraction device 1 according to the invention, which is also shown in FIG. 9. As can be seen, the device 1 comprises sampling means having a trap 2 filled with a sorbent 3. At the ends of the trap 2 there are arranged respective electrical heating elements 8 which can be charged with electrical current via dedicated connecting cables 7. The trap 2 at one end thereof is connected to a sampling needle 4 and at its other end is connected to a flow channel 5 extending through a body 6 of the device 1, for selectively connecting the trap 2 to a vacuum source 11 or to an inert gas source 12 via the gas distribution block 9.

During performance of the method according to the invention, the flow channel 5 at its end facing away from the trap 2 is connected to a port C of the gas distribution block 2 according to FIG. 2a or FIG. 2b, and the valve 10, which is controlled by a controller 13, selectively connects the flow channel 5 to the vacuum source 11 (via port B) or to the inert gas source 12 (via port B). The gas distribution block 9 and the valve 10 together constitute a 3-port/2-way valve.

CONCLUSIONS

The newly developed DHS-VTT technique improves the extraction of volatile compounds from ACM. This can e.g. be achieved by a simple modification of the autosampler and by using commercial ITEX hardware. Using the principle of DHS-VTT provides a rapid extraction of target compounds with minimal damage to the sample and limited artefact formation. Working at reduced pressure increases the evaporation rate of the compounds while decreasing Henry's law volatility constants $K_H$. Extraction under reduced pressure avoids creating a system in equilibrium and thus extraction remains dynamic. The results show a good repeatability and sensitivity for the majority of the target molecules assessed. Only carboxylic acids show poorer results than the other target compounds because the extraction conditions were not adapted for these compounds.

Comparing the results of extraction by DHS-VTT (TTA, TGR, CSIII, and TTA/CSIII), HS-ITEX (TTA) and HS-SPME (DVB/CAR/PDMS), showed that DHS-VTT has benefits for both time and sensitivity of extraction for volatile compounds, including low, medium, and high-boiling point compounds (FIG. 1). The much larger amounts of compounds extracted with the DHS-VTT method facilitates and results in more efficient olfactometric analyses.

While there are shown and described presently preferred embodiments of the invention, it is to be distinctly understood that the invention is not limited thereto but may be otherwise variously embodied and practiced within the scope of the following claims.

REFERENCES

[1] T. Hüffer, X. L. Osorio, M. A. Jochmann, B. Schilling, T. C. Schmidt, Multi-walled carbon nanotubes as sorptive material for solventless in-tube microextraction (ITEX2)—as factorial design study, Anal Bioanal Chem, 405 (2013).

[2] M. A. Jochmann, X. Yuan, B. Schilling, T. C. Schmidt, In-tube extraction for enrichment of volatile organic hydrocarbons from aqueous samples, J Chromatogr A, 1179 (2008).

[3] J. Zapata, R. Lopez, P. Herrero, V. Ferreira, Multiple automated headspace in-tube extraction for the accurate analysis of relevant wine aroma compounds and for the estimation of their relative liquid-gas transfer rates, J Chromatogr A, 1266 (2012) 1-9.

[4] M. T. Suzuki, S. Tsuge; T. Takeuchi, Gas chromatographic estimation of occluded solvents in adhesive tape by periodic introduction method, Anal Chem, 42 (1970).

[5] B. Kolb, P. Pospisil, A gas chromatographic assay for quantitative analysis of volatiles in solid materials by discontinuous gas extraction, Chromatographia, 10 (1977) 705-711.

[6] E. A. Tayss, J. Santalucia, R. S. Robinson, D. L. Carroll, Analysis of flavor absorption into plastic packaging materials using multiple headspace extraction gas chromatography, Journal of Chromatography, 438 (1988) 281-289.

[7] D. Michiu, M. Tofana, S. A. Socaci, E. Mudura, L. C. Salanta, A. C. Farcas, Optimization of ITEX/GC-MS method for beer wort volatile compounds characterisation, J Agroaliment Proc Technol 18 (2012).

[8] J. Leaks, M. A. Jochmann, B. Schilling, K. Molt, T. C. Schmidt, In-Tube Extraction-GC-MS as a High-Capacity Enrichment Technique for the Analysis of Alcoholic Beverages, J Agri Food Chem, 62 (2014).

[9] L. Niu, J. Bao, L. Zhao, Y. Zhang, Odor Properties and volatile Compounds Analysis of *Torreya grandis* Aril Extracts, J Essent Oil Res, 23 (2011).

[10] L.-C. Salanta, M. Tofana, S. A. Socaci, C. Lazar, D. Michiu, A. Farces, Determination of the Volatile Compounds from Hop and Hop Products using ITEX/GC-MS Technique, J Agroaliment Proc Technol, 18 (2012).

[11] T. Senthilkumar, D. S. Jayas, N. D. G. White, M. S. Freund, C. Shafai, D. J. Thomson, Characterization of volatile organic compounds released by granivorous insects in stored wheat, J Stored Prod Res, 48 (2012).

[12] S. A. Socaci, M. Tofana, C. Socaciu, E. Mudura, C. Muresan, Optimization of ITEX/GC-MS Method for Determination of Indigenous Rosemary Volatiles, Bulletin UASVM Agriculture, 68 (2011) 7.

[13] S. A. Socaci, C. Socaciu, M. Tofana, I. V. Rati, A. Pintea, In-tube Extraction and GC-MS Analysis of Volatile Components from Wild and Cultivated sea buckthorn (*Hippophae rhamnoides* L. ssp. Capatica) Berry Varieties and Juice, Phytochem Anal, 24 (2012).
[14] J. Zapata, L. Mateo-Vivaracho, R. F. Lopez, V. Ferreira, Automated and quantitative headspace in-tube extraction for the accurate determination of highly volatile compounds from wines and beers, J Chromatogr A, 1230 (2012).
[15] S. Kakuta, Y. Bando, S. Nishiumi, Yoshida, E. Fukusaki, T. Bamba, Metabolic profiling of oxidized lipid-derived volatiles in blood by gas chromatography/mass spectrometry with in-tube extraction, Mass Spectrom (Tokyo), 2 (2013) A0018.
[16] A. C. Farcas, S. A. Socaci, F. V. Dulf, M. Tofana, E. Mudura, Volatile profile, fatty acids composition and total phenolics content of brewers' spent grain byproduct with potential use in the development of new functional foods, J Cereal Sci, 64 (2015) 34.
[17] S. A. Socaci, C. Socaciu, C. Muresan, A. Farces, M. Tofana, S. Vicas, A. Pintea, Chemometric discrimination of different tomato cultivars based on their volatile fingerprint in relation to lycopene and total phenolics content, Phytochem Anal, 25 (2014) 161-169.
[18] M. Kusano, M. Kobayashi, Y. Iizuka, A. Fukushima, K. Saito, Unbiased profiling of volatile organic compounds in the headspace of *Allium* plants using an in-tube extraction device, BMC Res Notes, 9 (2016) 133.
[19] S. B. Ampuero, S. Bogdanov, J. O. Bosset, Classification of unifloral honeys with an MS-based electronic nose using different sampling modes: SHS, SPME and INDEX, Eur Food Res Technol, 218 (2004) 9.
[20] J. Laaks, M. A. Jochmann, B. Schilling, T. C. Schmidt, Optimization strategies of in-tube extraction (ITEX) methods, Anal Bioanal Chem, 407 (2015) 6827-6838.
[21] I. Rasanen, J. Viinamaki, E. Vuori, I. Ojanpera, Headspace in-tube extraction gas chromatography-mass spectrometry for the analysis of hydroxylic methyl-derivatized and volatile organic compounds in blood and urine, J Anal Toxicol, 34 (2010) 113-121.
[22] J. Laaks, M. A. Jochmann, B. Schilling, T. C. Schmidt, In-tube extraction of volatile organic compounds from aqueous samples: an economical alternative to purge and trap enrichment, Anal Chem, 82 (2010) 7641-7648.
[23] A. Kremser, M. A. Jochmann, T. C. Schmidt, Systematic comparison of static and dynamic headspace sampling techniques for gas chromatography, Anal Bioanal Chem, 408 (2016) 6567-6579.
[24] N. P. Brunton, D. A. Cronin, F. J. Monahan, The effects of temperature and pressure on the performance of Carboxen/PDMS fibres during solid phase microextraction (SPME) of headspace volatiles from cooked and raw turkey breast, Flavour Fragr J, 16 (2001).
[25] E. K. Yianthi, N. Kalogerakis, E. Psillakis, Vacuum-assisted headspace solid phase microextraction of polycyclic aromatic hydrocarbons in solid samples, Anal Chim Acta, 890 (2015) 108-116.
[26] E. Yiantzi, N. Kalogerakis, E. Psillakis, Design and testing of a new sampler for simplified vacuum-assisted headspace solid-phase microextraction, Anal Chim Acta, 927 (2016) 46-54.
[27] P. J. L. Nyman W. Limm, T. H. Begley, S. J. Chirtel, Single-Laboratory Validation of a Method for the Determination of Select Volatile Organic Compounds in Foods by Using Vacuum Distillation with Gas Chromatography/ Mass Spectrometry, J. AOAC Int., 97 (2014) 10.
[28] E. Psillakis, E. Yiantzi, L. Sanchez-Prado, N. Kalogerakis, Vacuum-assisted headspace solid phase microextraction: improved extraction of semivolatiles by non-equilibrium headspace sampling under reduced pressure conditions, Anal Chim Acta, 742 (2012) 30-36.
[29] M. H. Hiatt, Vacuum Distillation Coupled with Gas Chromatography/Mass Spectrometry for the Analysis of Environmental Samples, Anal Chem, 67 (1995) 8.
[30] M. H. Hiatt, Analyses of fish tissue by vacuum distillation/gas chromatography/mass spectrometry, Anal Chem, 69 (1997) 1127-1134.
[31] P. Fuchsmann, M. T. Stern, Y. A. Brugger, K. Breme, Olfactometry Profiles and Quantitation of Volatile Sulfur Compounds of Swiss Tilsit Cheeses, J Agric Food Chem, 63 (2015) 7511-7521.
[32] D. Canac-Arteaga, C. Viallon, J.-L. Berdagué, Analytical artifacts caused by the presence of water vapor int the headspace of food products, Analusis, 28 (2000).
[33] E. Psillakis, A. Mousouraki, E. Yiantzi, N. Kalogerakis, Effect of Henry's law constant and operating parameters on vacuum-assisted headspace solid phase microextraction, J Chromatogr A, 1244 (2012) 55-60.
[34] T. Gorecki, J. Pawliszyn, Effect of sample volume on quantitative analysis by solid-phase microextraction. Part 1. Theoretical considerations, Analyst, 122 (1997) 1079-1086.
[35] T. K. Gorecki, A. Khaled, J. Pawliszyn, The effect of sample volume on quantitative analysis by solid phase microextraction. Part 2. Experimental verification, in: Analyst, 1998, pp. 2819-2824.
[36] T. E. Zimmermann, W. J. Ensinger, T. C. Schmidt, Depletion solid-phase microextraction for the evaluation of fiber-sample partition coefficients of pesticides, J Chromatogr A, 1102 (2006) B.
[37] C. Arthur, J. Pawliszyn, Solid phase microextraction with thermal desorption using fused silica optical fibers, Anal. Chem. 62, 1990, p. 2145-2148.
[38] J. Pawliszyn, Solid Phase Microextraction—Theory and Practice, Wiley-VCH, New York/Weinheim 1997.

The invention claimed is:
1. A headspace extraction and analysis method for volatile compounds, wherein a continuous flow of volatile compounds is forced by applying reduced pressure conditions, the method comprising:
  (i) inserting a needle of a sampling means via a septum into a headspace above a solid or liquid sample contained in a container closed by said septum, wherein said sampling means has a trap filled with at least one sorbent, said trap has a first end and a second end, at the first end the trap is connected to the needle, and at the second end the trap is connected with at least one flow channel connected to a valve that is switchable between a vacuum source and an inert gas source, the valve being fluidly connected to a gas distribution block having a first port connected to the at least one flow channel, a second port connected to the vacuum source and a third port connected to the inert gas source,
  (ii) connecting the vacuum source to the sampling means on the side of the second end of the trap via the valve and the gas distribution block, so that volatile compounds in the headspace are sucked out from the container into the trap,
  (iii) removing the sampling means from the container,
  (iv) connecting the inert gas source to the sampling means via the valve and the gas distribution block to dry the sampling means by flowing an inert gas supplied by the inert gas source through the sampling means from the second side, (v) inserting the needle into an injector of a gas chromatography apparatus, (vi) desorbing the volatile compounds from the trap by flowing the inert gas supplied by the insert gas source through the at least one sorbent from the second side, (vii) analyzing the volatile compounds and (viii) cleaning the trap and needle by flushing with the inert gas supplied by the inert gas source.

2. The method of claim 1, wherein the temperature of the trap during steps (i) to (iii) is in the range of 0 to 100° C.

3. The method of claim 1, wherein the temperature of the trap during step (ii) is in the range from 10° C. to 40° C.

4. A headspace extraction and analysis method for volatile organic compounds, wherein a continuous flow of volatile organic compounds is forced by applying reduced pressure conditions, the method comprising:

(i) inserting a needle of a sampling means through a septum into a headspace above a solid or liquid sample contained in a container closed by the septum, wherein the sampling means includes a trap filled with at least one sorbent, the trap has a first end and a second end, the first end of the trap is connected to the needle, and the second end of the trap is connected with at least one flow channel connected to a valve that is switchable between a vacuum source and an inert gas source, (ii) connecting the vacuum source to the second end of the trap via the valve, wherein volatile organic compounds in the headspace are suctioned out from the headspace of the container and are adsorbed by the at least one sorbent in the trap, (iii) removing the needle of the sampling means from the septum and the container, (iv) connecting the inert gas source to the second end of the trap via the valve, wherein organic compounds adsorbed by the sorbent are dried by flowing an inert gas supplied by the inert gas source through the trap, the inert gas and moisture exiting the trap via the needle, (v) inserting the needle into an injector of a gas chromatography apparatus, (vi) desorbing the volatile organic compounds from the sorbent and conveying the desorbed organic volatile compounds through the needle to an injector of a gas chromatography apparatus by flowing the inert gas supplied by the insert gas source via the valve and second end of the trap through the at least one sorbent while the needle is inserted in the injector of the gas chromatography apparatus, (vii) analyzing the volatile organic compounds in the gas chromatography apparatus, and (viii) cleaning the trap and needle by flushing by supplying the inert gas from the inert gas source to the second end of the trap via the valve.

5. The method of claim 4, wherein the temperature of the trap in steps (i) to (iii) is lower than the temperature of the trap in steps (vi) and (viii).

6. The method of claim 4, wherein:
the sampling means further includes a body defining said at least one flow channel,
in step (ii), the at least one flow channel is connected to the vacuum source via the valve, and
in the steps (iv), (vi) and (viii), the at least one flow channel is connected to the inert gas source via the valve.

7. The method of claim 4, wherein the inert gas is nitrogen.

8. The method of claim 4, wherein the sampling means further comprises a heating means for heating the trap or a cooling means for cooling the trap.

9. The method of claim 4, wherein the temperature of the solid or liquid sample is in the range of 0 to 100° C. during step (ii).

10. The method of claim 4, wherein the pressure in the headspace in step (ii) is below 100 mbar.

11. The method of claim 4, wherein the temperature of the injector in steps (v) and (vi) is in a range of −10 to 20° C.

12. The method of claim 4, wherein the at least one sorbent in the trap is a combination of at least two sorbents present in the trap in mixed or layered form.

13. The method of claim 4, wherein the temperature in the trap in step (iv) is between 150 to 450° C.

14. The method of claim 4, wherein the flow of the inert gas in step (iv) is 100 to 250 mL min−1.

15. The method of claim 4, wherein the trap is at a temperature in the range from 10° C. to 40° C. during step (ii).

16. The method of claim 15, wherein:
the pressure in the headspace in step (ii) is below 100 mbar,
the temperature in the trap in step (iv) is between 150 to 450° C., and
the flow of the inert gas in step (iv) is 100 to 250 mL/min.

* * * * *